US012607986B2

(12) United States Patent
Watanabe

(10) Patent No.: US 12,607,986 B2
(45) Date of Patent: Apr. 21, 2026

(54) ABNORMAL STATE MONITORING SYSTEM AND ABNORMAL STATE MONITORING METHOD

(71) Applicant: Hitachi, Ltd., Tokyo (JP)

(72) Inventor: Akinobu Watanabe, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 415 days.

(21) Appl. No.: 18/079,117

(22) Filed: Dec. 12, 2022

(65) Prior Publication Data

US 2023/0195086 A1 Jun. 22, 2023

(30) Foreign Application Priority Data

Dec. 16, 2021 (JP) ................................. 2021-204238

(51) Int. Cl.
*G05B 19/418* (2006.01)
(52) U.S. Cl.
CPC ..... *G05B 19/4184* (2013.01); *G05B 19/4183* (2013.01)
(58) Field of Classification Search
None
See application file for complete search history.

(56) References Cited

U.S. PATENT DOCUMENTS

2003/0222815 A1* 12/2003 Tucker .................... G01S 19/14
342/357.52
2014/0350993 A1* 11/2014 Kawada ............. G06Q 10/0639
705/7.25

2016/0051153 A1* 2/2016 Mously .................. A61B 5/747
600/509
2016/0132046 A1* 5/2016 Beoughter ........... G06F 16/248
700/17

(Continued)

FOREIGN PATENT DOCUMENTS

JP 2020-091556 A 6/2020
JP 2021-125131 A 8/2021

(Continued)

OTHER PUBLICATIONS

Office Action mailed Feb. 12, 2025 in Japanese Application No. 2021-204238.

(Continued)

*Primary Examiner* — Hua Lu
(74) *Attorney, Agent, or Firm* — Miles & Stockbridge, P.C.

(57) ABSTRACT

Work efficiency and quality are improved. The invention includes: a sensor information acquisition unit configured to acquire, from a sensor configured to detect a state of a worker, sensor information indicating a detection result; a work check data holding unit configured to hold in advance, as work check data, an action of the worker assumed from a work procedure; and an abnormality detection unit configured to detect an abnormality in work by comparing the sensor information with the work check data. Further, a control unit is provided that is configured to generate flag data including a flag indicating an abnormal level and state information indicating an abnormal state when the abnormality detection unit detects an abnormality, and transmit the flag data to the management device. A management device transmits instruction information based on the flag data.

7 Claims, 13 Drawing Sheets

(56)      References Cited

U.S. PATENT DOCUMENTS

| | | | | |
|---|---|---|---|---|
| 2017/0075336 | A1* | 3/2017 | Ueda | G05B 23/0264 |
| 2017/0090469 | A1* | 3/2017 | Yokochi | G05B 19/41875 |
| 2017/0131705 | A1* | 5/2017 | Ishii | G05B 23/0227 |
| 2017/0284068 | A1* | 10/2017 | Nakamura | G01N 33/30 |
| 2018/0129193 | A1* | 5/2018 | Gotou | G06Q 10/00 |
| 2018/0224831 | A1* | 8/2018 | Liu | G05B 23/0232 |
| 2018/0374026 | A1* | 12/2018 | Osawa | G06F 9/453 |
| 2019/0224841 | A1* | 7/2019 | Ly | A61B 5/4504 |
| 2019/0258230 | A1* | 8/2019 | Chiba | G05B 19/418 |
| 2019/0286096 | A1* | 9/2019 | Kawanoue | G05B 23/0254 |
| 2019/0310620 | A1* | 10/2019 | Kamiguti | G06F 11/0766 |
| 2020/0183354 | A1* | 6/2020 | Atsumi | G05B 19/4183 |
| 2020/0192324 | A1* | 6/2020 | Asai | G05B 19/406 |
| 2020/0209838 | A1* | 7/2020 | Kawakami | G05B 19/4183 |
| 2020/0276680 | A1* | 9/2020 | Green | B23Q 11/0092 |
| 2020/0310393 | A1* | 10/2020 | Nakaya | G05B 19/4187 |
| 2020/0334477 | A1* | 10/2020 | Aoi | A61B 5/11 |
| 2020/0394730 | A1* | 12/2020 | Kawano | H04L 67/025 |
| 2021/0034058 | A1* | 2/2021 | Subramanian | G06T 17/05 |
| 2021/0116906 | A1* | 4/2021 | Tsutsumi | A61B 5/0205 |
| 2021/0149381 | A1* | 5/2021 | Hatakenaka | G05B 23/0283 |
| 2021/0278832 | A1* | 9/2021 | Koumoto | G05B 23/0218 |
| 2021/0333768 | A1* | 10/2021 | Umemoto | G05B 23/0243 |
| 2022/0083032 | A1* | 3/2022 | Kim | G05B 19/41865 |
| 2022/0161427 | A1* | 5/2022 | Yerazunis | B25J 9/1674 |
| 2022/0206481 | A1* | 6/2022 | Miller | G05B 19/4188 |
| 2022/0295244 | A1* | 9/2022 | Kurniawan | G05B 19/4183 |
| 2022/0315358 | A1* | 10/2022 | Ryan | B25J 9/1697 |
| 2023/0046190 | A1* | 2/2023 | Sugawara | G05B 23/0297 |
| 2023/0104714 | A1* | 4/2023 | Onose | G05B 19/4183 700/108 |
| 2023/0107387 | A1 | 4/2023 | Akinobu et al. | |
| 2023/0133242 | A1* | 5/2023 | Yoshizawa | G06Q 10/063116 705/7.15 |
| 2023/0138872 | A1* | 5/2023 | Akisada | G05B 19/4183 700/1 |
| 2023/0166366 | A1* | 6/2023 | Hsu | G05B 19/4183 702/189 |
| 2023/0291793 | A1* | 9/2023 | Kang | H04L 67/12 |
| 2023/0341291 | A1* | 10/2023 | Yano | G01M 11/083 |

FOREIGN PATENT DOCUMENTS

| | | |
|---|---|---|
| JP | 2021-131599 A | 9/2021 |
| WO | 2019116485 A1 | 6/2019 |

OTHER PUBLICATIONS

Office Action mailed Jul. 1, 2025 in Japanese Application No. 2021-204238.

* cited by examiner

| FLAG | STATE INFORMATION | ACQUIRED DATA |
|---|---|---|
| RESPONSE 1 | POSTURE: WALK SLOWLY<br>FACIAL COLOR: POOR | POSITION COORDINATES AND MOVING LINE OF PERSON<br>IMAGE DATA OF PERSON<br>DISTANCE DATA OF PERSON<br>TEMPERATURE AND HUMIDITY AROUND PERSON |
| RESPONSE 2 | FACILITY AND PERSON SUDDENLY APPROACH | POSITION COORDINATES AND MOVING LINE OF PERSON<br>POSITION COORDINATES OF FACILITY |
| RESPONSE 3 | TORRENTIAL RAIN | RAINFALL AMOUNT<br>SURROUNDING IMAGE DATA |
| ⋮ | ⋮ | ⋮ |
| IMPORTANCE 1 | BUILDING DESTRUCTION | POSITION COORDINATES AND MOVING LINE OF PERSON<br>POSITION COORDINATES OF FACILITY<br>SURROUNDING IMAGE DATA<br>SURROUNDING DISTANCE DATA |
| IMPORTANCE 2 | SELF-DESTRUCTION | SOUND OF FACILITY<br>TEMPERATURE OF FACILITY |
| IMPORTANCE 3 | MAINTENANCE IS REQUIRED | SOUND OF FACILITY<br>TEMPERATURE OF FACILITY<br>CONTINUOUS OPERATION TIME<br>SURROUNDING IMAGE DATA<br>SURROUNDING DISTANCE DATA<br>POSITION COORDINATES OF FACILITY |
| ⋮ | ⋮ | ⋮ |
| INTERVENTION 1 | DETERMINATION BY EXPERT IS REQUIRED | POSITION COORDINATES AND MOVING LINE OF PERSON<br>IMAGE DATA OF PERSON<br>DISTANCE DATA OF PERSON<br>TEMPERATURE AND HUMIDITY AROUND PERSON<br>POSITION COORDINATES AND MOVING LINE OF FACILITY<br>SURROUNDING IMAGE DATA<br>SURROUNDING DISTANCE DATA<br>SURROUNDING TEMPERATURE AND HUMIDITY<br>RAINFALL AMOUNT<br>SOUND OF FACILITY<br>TEMPERATURE OF FACILITY |
| INTERVENTION 2 | ARTIFICIAL INTELLIGENCE INSTRUCTION IS REQUIRED | SAME AS ABOVE |
| INTERVENTION 3 | ONLY EMERGENCY TREATMENT | (NONE) |
| ⋮ | ⋮ | ⋮ |

| FLAG | STATE INFORMATION | DETERMINATION CRITERIA |
|---|---|---|
| 421 RESPONSE 1 | POSTURE: WALK SLOWLY FACIAL COLOR: POOR | FACIAL COLOR: FATIGUE LEVEL IS 80% OR MORE → BREAK OF 1 h OR LONGER<br>POSTURE: CROUCH, FALL DOWN → RESCUE<br>POSTURE: UNSTEADY, LEG CRAMP → BREAK OF 1 h OR LONGER<br>TEMPERATURE/HUMIDITY: 39° C/90% FOR 1 h → BREAK OF 0.5 h |
| 422 RESPONSE 2 | FACILITY AND PERSON SUDDENLY APPROACH | CLOSEST APPROACH DISTANCE 3 m/PREDICTION TIME 15 s LATER → STOP<br>OTHER CASES →ISSUE ALARM, REDUCE SPEED, CHANGE ROUTE |
| 423 RESPONSE 3 | TORRENTIAL RAIN | ACCORDING TO RAINFALL METER AND RESULTS OF IMAGE RECOGNITION, 500 mm/h CONTINUES FOR 0.5 h → STOP<br>500 mm/h CONTINUES FOR 1 h → EVACUATE |
| ⋮ | ⋮ | ⋮ |
| 424 IMPORTANCE 1 | BUILDING DESTRUCTION | CLOSEST APPROACH DISTANCE 3 m → STOP<br>ABNORMALITY IN SURROUNDING IMAGE DATA IS PRESENT → EVACUATE<br>ABNORMALITY IN SURROUNDING DISTANCE DATA IS PRESENT → EVACUATE |
| 425 IMPORTANCE 2 | SELF-DESTRUCTION | SOUND OF FACILITY: SPECIFIC FREQUENCY IS DETECTED/CONTINUES FOR 1 m → STOP<br>TEMPERATURE OF FACILITY: PORTION OF 90 DEGREES OR MORE IS DETECTED/CONTINUES FOR 1 m → STOP |
| 426 IMPORTANCE 3 | MAINTENANCE IS REQUIRED | SOUND OF FACILITY: SPECIFIC FREQUENCY IS DETECTED → MAINTENANCE<br>TEMPERATURE OF FACILITY: PORTION OF 90 DEGREES OR MORE IS DETECTED → MAINTENANCE<br>CONTINUOUS OPERATION TIME: 50 h OR LONGER → MAINTENANCE<br>CALCULATE NECESSARY MOVEMENT TIME AND REMAINING OPERATION TIME BASED ON SELF-POSITION, SURROUNDING IMAGE DATA, AND SURROUNDING DISTANCE DATA |
| ⋮ | ⋮ | ⋮ |
| 427 INTERVENTION 1 | DETERMINATION BY EXPERT IS REQUIRED | ABNORMALITIES OCCUR<br>FOR EXAMPLE: PRIORITY DETERMINATION AT TIME OF SIMULTANEOUS OCCURRENCE OF FLAGS<br>FOR EXAMPLE: DETERMINATION AT THE TIME WHEN SAVING DESTINATIONS/MOVEMENT DESTINATIONS OF PERSONS/FACILITIES CONFLICT |
| 428 INTERVENTION 2 | ARTIFICIAL INTELLIGENCE INSTRUCTION IS REQUIRED | INDEPENDENT ABNORMALITY NOT INCLUDED IN EMERGENCY PROCESSING LIST OCCURS<br>FOR EXAMPLE: CORRESPONDENCE AT THE TIME OF DETECTION OF UNKNOWN PHENOMENA (IMAGE ABNORMALITY, SOUND FREQUENCY ABNORMALITY) |
| 429 INTERVENTION 3 | ONLY EMERGENCY TREATMENT | ABNORMALITY INCLUDED IN EMERGENCY PROCESSING LIST OCCURS |
| ⋮ | ⋮ | ⋮ |

| FLAG | STATE INFORMATION | SENSOR DATA | INSTRUCTION |
|---|---|---|---|
| 431 RESPONSE 1 | POSTURE: WALK SLOWLY FACIAL COLOR: POOR | POSITION COORDINATES AND MOVING LINE OF PERSON (X1, Y1), 2 km/h IMAGE DATA OF PERSON (FACIAL COLOR: FATIGUE LEVEL 90%) DISTANCE DATA OF PERSON (WOBBLING) TEMPERATURE AND HUMIDITY AROUND PERSON (37 DEGREES/90% FOR 2 h) | BREAK OF 1 h |
| 432 RESPONSE 2 | FACILITY AND PERSON SUDDENLY APPROACH | POSITION COORDINATES AND MOVING LINE OF PERSON (X1, Y1), 4 km/h POSITION COORDINATES OF FACILITY (X2, Y2), 4 km/h CLOSEST APPROACH DISTANCE 1 M/PREDICTION TIME 20 s LATER | REDUCE SPEED |
| 433 RESPONSE 3 | TORRENTIAL RAIN | RAINFALL AMOUNT (CURRENTLY 100 m, CONTINUE FOR 5 h) | STOP |
| ⋮ | ⋮ | ⋮ | |
| 434 IMPORTANCE 1 | BUILDING DESTRUCTION | CLOSEST APPROACH DISTANCE 5 m ANOTHER FACILITY IS PRESENT BUT NO PERSON IS PRESENT IN IMAGE DATA | EVACUATE |
| 435 IMPORTANCE 2 | SELF-DESTRUCTION | ABNORMAL SOUND AT SPECIFIC FREQUENCY IS DETECTED/CONTINUES FOR 1 m PORTION OF 90 DEGREES OR MORE IS DETECTED/CONTINUES FOR 1 m | STOP |
| 436 IMPORTANCE 3 | MAINTENANCE IS REQUIRED | SPECIFIC FREQUENCY (90 Hz) IS DETECTED PORTION OF 90 DEGREES OR MORE IS DETECTED CONTINUOUS OPERATION TIME: 50 h OR LONGER REQUIRED MOVEMENT TIME IS 2 h AND REMAINING OPERATION TIME IS 6 h BASED ON SELF-POSITION, SURROUNDING IMAGE DATA, AND SURROUNDING DISTANCE DATA | END WORK AFTER 4 h AND RETURN TO MAINTENANCE |
| ⋮ | ⋮ | ⋮ | |
| 437 INTERVENTION 1 | DETERMINATION BY EXPERT IS REQUIRED | FLAGS OCCUR (2 FACILITIES APPROACHING) PERSON IS PRESENT IN VICINITY OF SAVING DESTINATION STAGNATION DUE TO DIFFICULT WORK | STOP 3 FACILITIES AND ISSUE ALARM |
| 438 INTERVENTION 2 | ARTIFICIAL INTELLIGENCE INSTRUCTION IS REQUIRED | UNKNOWN PHENOMENON (UNKNOWN OBJECT IN IMAGE DATA) DETECTION → AS RESULT OF DB COLLATION AND OBJECT ESTIMATION, ABNORMALLY INTRUDING VEHICLE IS DETERMINED TO BE PRESENT | STOP, ISSUE ALARM |
| 439 INTERVENTION 3 | ONLY EMERGENCY TREATMENT | (NONE) | (NONE) |
| ⋮ | ⋮ | ⋮ | |

| WORK ID | DETERMINATION CONDITION |
|---|---|
| A | FIRST WORK PROCESSING A1<br>· NUMBER OF TIMES OF DETECTION OF LEFT HAND: a TIMES OR MORE AND b TIMES OR LESS<br>· NUMBER OF DETECTION OF RIGHT HAND: c TIMES OR MORE AND d TIMES OR LESS<br>· DETECTION START TIMING OF LEFT HAND: FROM e SECONDS TO f SECONDS AFTER START<br>· DETECTION START TIMING OF RIGHT HAND: FROM g SECONDS TO h SECONDS AFTER START<br>· DETECTION END TIMING OF LEFT HAND: FROM i SECONDS TO j SECONDS AFTER START<br>· DETECTION END TIMING OF RIGHT HAND: FROM k SECONDS TO m SECONDS AFTER START<br>· DETECTION TIME LENGTH OF LEFT HAND: n SECONDS OR MORE AND p SECONDS OR LESS PERTIME<br>· DETECTION TIME LENGTH OF RIGHT HAND: q SECONDS OR MORE AND r SECONDS OR LESS PERTIME<br>· NEXT STEP: A2 IS PRESENT. INTERVAL FROM A2: s SECONDS OR MORE AND t SECONDS OR LESS    ~1311 |
|  | SECOND WORK PROCESSING A2<br>· NUMBER OF TIMES OF DETECTION OF LEFT HAND: a' TIMES OR MORE AND b' TIMES OR LESS<br>· NUMBER OF DETECTION OF RIGHT HAND: c' TIMES OR MORE AND d' TIMES OR LESS<br>· DETECTION START TIMING OF LEFT HAND: FROM e' SECONDS TO f' SECONDS AFTER START<br>· DETECTION START TIMING OF RIGHT HAND: FROM g' SECONDS TO h' SECONDS AFTER START<br>· DETECTION END TIMING OF LEFT HAND: FROM i' SECONDS TO j' SECONDS AFTER START<br>· DETECTION END TIMING OF RIGHT HAND: FROM k' SECONDS TO m' SECONDS AFTER START<br>· DETECTION TIME LENGTH OF LEFT HAND: n' SECONDS OR MORE AND p' SECONDS OR LESS PER TIME<br>· DETECTION TIME LENGTH OF RIGHT HAND: q' SECONDS OR MORE AND r' SECONDS OR LESS PER TIME<br>· NEXT STEP: A3 IS PRESENT. INTERVAL FROM A3: s' SECOND OR MORE AND t' SECOND OR LESS    ~1312 |
|  | THIRD WORK PROCESSING A3<br>⋮<br>· NEXT STEP: NONE    ~1313 |
| B | ⋮    ~1314 |
|  | ⋮ |

ABNORMAL STATE MONITORING SYSTEM AND ABNORMAL STATE MONITORING METHOD

BACKGROUND OF THE INVENTION

1. Field of the Invention

The present invention relates to an abnormal state monitoring system and an abnormal state monitoring method for detecting an abnormality in work by a worker.

2. Description of the Related Art

In the related art, there is a technique that enables support of on-site maintenance work from a remote place when an abnormality occurs during the on-site maintenance work. For example, WO 2019/116485 (Patent Literature 1) discloses that "A local server 10 for facility management includes a proxy work management unit 42 communicatively connected to a central server 12 for proxy management. The proxy work management unit 42 enables proxy maintenance work through a remote operation from a maintenance operator's terminal device 26 that is communicatively connected to the central server 12 when an error code is cutout while maintenance work in which a set value stored in a set value storage unit 46 is changed is performed at a maintained building. Further, the proxy work management unit 42 is capable of displaying, on display units 50 and 72 provided in the maintained building, a proxy request screen including an entry field for the error code and another entry field for inputting contents of the maintenance work performed at the maintained building at the time of output of the error code."

According to the related art described above, the proxy maintenance work can be performed through the remote operation when the error code is output. However, for example, when the worker performs erroneous work or is unfamiliar with the work, it is preferable to support the worker before the error code is output.

The invention has been made to solve the above problem, and an object thereof is to provide an abnormal state monitoring system that improves work efficiency and quality by detecting an abnormality in work at an early stage and supporting a worker.

SUMMARY OF THE INVENTION

In order to achieve the above object, a representative abnormal state monitoring system according to the invention includes: a sensor information acquisition unit configured to acquire, from a sensor configured to detect a state of a worker, sensor information indicating a detection result; a work check data holding unit configured to hold in advance, as work check data, an action of the worker assumed from a work procedure; and an abnormality detection unit configured to detect an abnormality in work by comparing the sensor information with the work check data.

One representative abnormal state monitoring methods according to the invention includes: a work check data holding step of holding, as work check data, an action of a worker assumed from a work procedure; a sensor information acquisition step of acquiring, from a sensor configured to detect a state of the worker, sensor information indicating a detection result; and an abnormality detection step of detecting an abnormality in work by comparing the sensor information with the work check data.

Other aspects of the invention will be described in the following embodiment.

According to the invention, work efficiency and quality can be improved. Problems, configurations, and effects other than those described above will be clarified by the following description of an embodiment of the invention.

BRIEF DESCRIPTION OF THE DRAWINGS

FIG. 5 is a diagram showing an example of an acquired data determination table in processing S1.

FIG. 6 is a diagram showing an example of an instruction determination table in processing S2.

FIG. 12 is a diagram showing instruction contents based on flag data and sensing data in the processing S2.

FIG. 13 is a diagram showing an example of a work instruction sheet table in processing S10.

DESCRIPTION OF THE PREFERRED EMBODIMENTS

Figure 1:
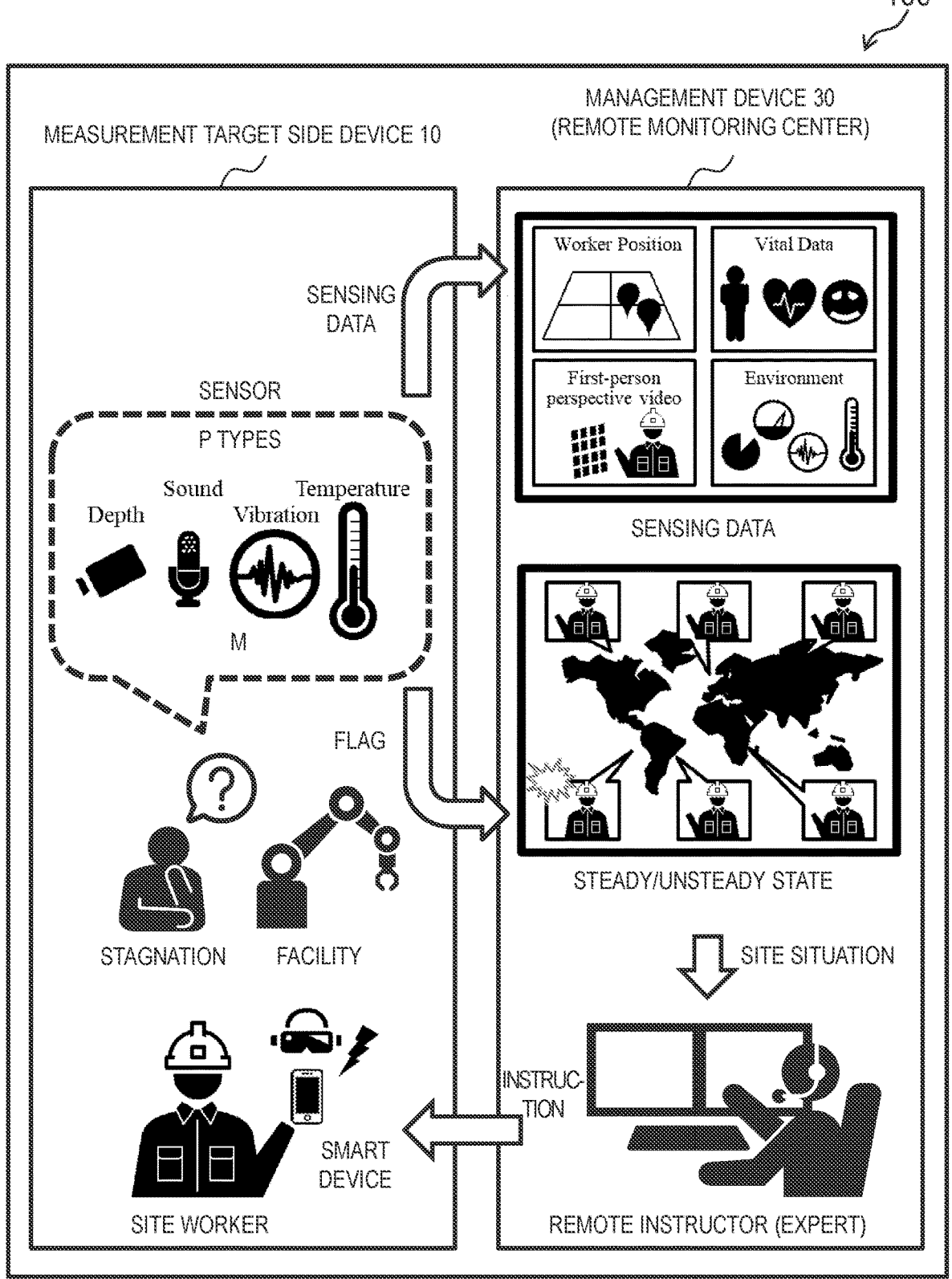
FIG. 1 is a diagram showing an outline of an abnormal state monitoring system of a measurement target according to an embodiment.

Hereinafter, an embodiment of the invention will be described with reference to the drawings. The embodiment is an example for describing the invention, and omission and simplification are appropriately made for clarified description. The invention can be implemented in various other forms. Unless otherwise specified, each component may be singular or plural.

In order to facilitate understanding of the invention, a position, a size, a shape, a range, or the like of each configuration shown in the drawings may not represent an actual position, size, shape, range, or the like. Therefore, the invention is not necessarily limited to the position, size, shape, range, or the like shown in the drawings.

Examples of various types of information may be described by expressions such as "table", "list", and "queue", but the various types of information may be expressed by a data structure other than these expressions. For example, the various types of information such as "XX table", "XX list", and "XX queue" may be "XX information". When identification information is described, expressions such as "identification information", "identifier", "name", "ID", and "number" are used, but these expressions may be replaced with each other.

When there are a plurality of components having the same or similar functions, different subscripts may be added to the same reference numeral. When it is not necessary to distinguish the plurality of components from one another, the subscripts may be omitted in the description.

In the embodiment, processing performed by executing a program may be described. Here, a computer executes the program by a processor (for example, a CPU or a CPU), and performs the processing defined by the program using a storage resource (for example, a memory), an interface device (for example, a communication port), or the like. Therefore, a subject of the processing performed by executing the program may be the processor. Similarly, a subject of the processing executed by executing a program may be a controller, a device, a system, a computer, or a node which includes a processor. The subject of the processing performed by executing the program may be a calculation unit and may include a dedicated circuit that performs specific processing. Here, the dedicated circuit is, for example, a field programmable gate array (FPGA), an application specific integrated circuit (ASIC), a complex programmable logic device (CPLD), or the like.

A program may be installed on a computer from a program source. The program source may be, for example, a program distribution server or a storage medium readable by a computer. When the program source is the program distribution server, the program distribution server may include the processor and the storage resource that stores a program to be distributed, and the processor of the program distribution server may distribute the program to be distributed to another computer. In addition, in the embodiment, two or more programs may be implemented as one program, or one program may be implemented as two or more programs.

First Embodiment

<Outline of Abnormal State Monitoring System 100 of Measurement Target>

FIG. 1 is a diagram showing an outline of an abnormal state monitoring system 100 of a measurement target according to an embodiment.

Figure 2:
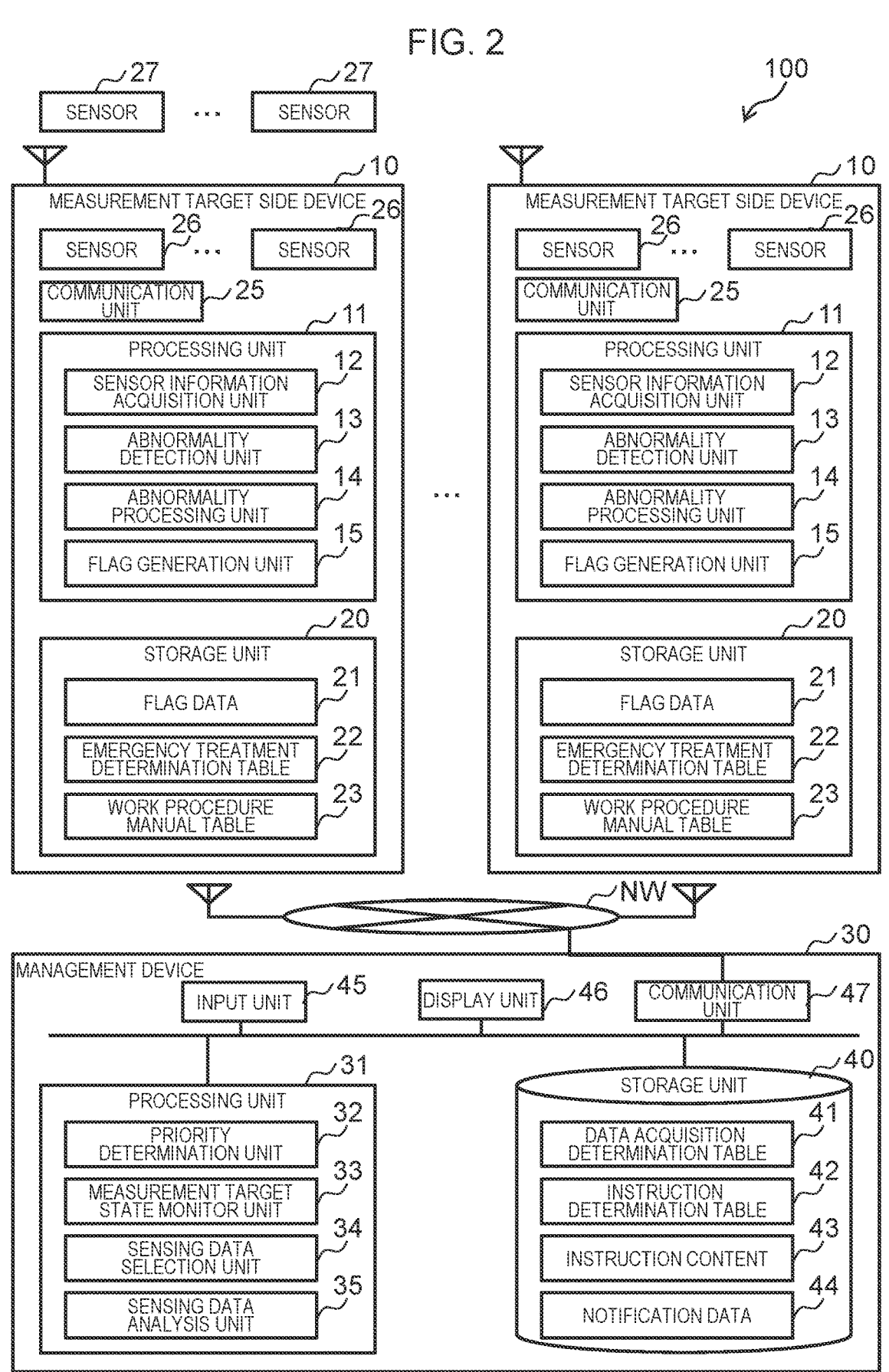
FIG. 2 is a diagram showing a configuration of the abnormal state monitoring system of the measurement target.

FIG. 2 is a diagram showing a configuration of the abnormal state monitoring system of the measurement target. The abnormal state monitoring system 100 of the measurement target includes a management device 30 (remote monitoring center) that monitors an unsteady state from a plurality of measurement targets including a plurality of infrastructure facilities operating in each site or persons working at the site, and a measurement target side device 10 provided in the measurement target. When an unsteady state (abnormal state) occurs, the measurement target side device 10 transmits flag data 21 indicating an unsteady state to be described later to the management device 30 which is a remote monitoring center. The management device 30 analyzes the flag data 21 and requests necessary sensing data from the measurement target side device 10. The measurement target side device 10 transmits the requested sensing data to the management device 30, and the management device 30 transmits instruction information to the measurement target side device 10 based on the flag data and the sensing data.

The abnormal state monitoring system 100 of the measurement target is provided with M sensors at N positions, and acquires and uses P types of sensor information. M, N, and P mean the number of sensors provided in an infrastructure facility and site workers shown in FIG. 1 and sensors provided in the periphery thereof. In other words, M, N, and P mean the number of sensors provided in the measurement target side device 10 and sensors provided around the measurement target side device 10. Examples of the P types of sensors include an image distance sensor, a voice sensor, a vibration sensor, a temperature sensor, and a vital sensor. In the case of a person, the sensors may be sensors provided in a smart device carried by the person, or wearable sensors incorporated in clothes, glasses, or a wristband worn by the person.

As an example of a measurement target, a case of inspection work of the infrastructure facility of water and sewage, power transmission, a road, a railroad, a bridge, a river, city gas, and the like that operates at an indoor site or an outdoor site will be described.

In a steady state, the infrastructure facility constantly senses a change in the surrounding environment or a change in a self-state with a plurality of sensors while operating according to a pre-programmed plan, and continues to check whether an abnormal value equal to or greater than a threshold is present in an output result from each sensor. As a result of the check, when an abnormal value equal to or greater than the threshold is detected, the measurement target side device 10 transitions from a steady state to an unsteady state. In the inspection work performed by an inspection worker, the inspection worker who goes to the infrastructure facility at the site performs the inspection periodically or in response to an abnormality notification. The content of the inspection work is performed according to a predetermined work procedure manual. In the case of detecting whether the inspection operator is in an abnormal state, the worker has, as the measurement target side device 10, a smart device, a smartwatch, or the like (worn by the worker or installed in the vicinity of the worker brought by the worker) including various sensors, processing units, and the like. The status of the inspection work is constantly measured by the plurality of sensors, and whether an abnormal value equal to or greater than the threshold defined in the work procedure manual is present is continuously checked with respect the output result from each sensor. As a result of the check, when an abnormal value equal to or greater than the threshold is detected, the measurement target side device 10 transitions from the steady state to the unsteady state.

When transitioning to the unsteady state, the measurement target side device 10 first performs a preset emergency treatment according to the abnormal value of the sensor. Next, the flag data 21 is generated based on the output result from each sensor. Further, the generated flag data 21 notified to the management device 30 via a network NW. After the flag data 21 is notified, the measurement target side device 10 waits for reception of an instruction from the management device 30. The instruction from the management device 30 includes an instruction in processing S1 to be described later and an instruction in processing S2 to be described later.

Although the inspection work of the infrastructure facility has been described as the measurement target, the same applies to the case of a site worker at a manufacturing site. In the case of a site worker at a production site, a production facility is the measurement target instead of the infrastructure facility, and the site worker is the measurement target instead of the inspection worker.

<Device Configuration of Abnormal State Monitoring System 100 of Measurement Target>

Next, a device configuration will be described with reference to FIG. 2.

When receiving the flag data 21, the management device 30 makes an instruction co acquire necessary sensing data as the processing S1. When receiving the sensing data, the management device 30 analyzes the flag data and the sensing data, and issues the best response instruction to the infrastructure facility at the site via the network NW according to an analysis result as the processing S2.

The measurement target side device 10 includes a processing unit 11 that monitors an unsteady state of a measurement target, a storage unit 20, a communication unit 25 that communicates with an external sensor 27 and the management device 30, and a plurality of internal sensors 26. The processing unit 11 includes a sensor information acquisition unit 12 (sensor information acquisition unit) that acquires sensor information of the plurality of sensors 26 and 27, an abnormality detection unit 13 (abnormality detection unit) that determines whether the sensor information indicates an abnormality, an abnormality processing unit 14 (control unit) that generates the flag data 21 including a flag indicating art abnormal level and state information indicating an abnormal state when the abnormality detection unit determines that an abnormality is indicated, and transmits the flag data 21 to the management device 30, a flag generation unit 15 that generates a flag, and the like. The storage unit 20 stores the flag data 21, an emergency treatment determination table 22, a work procedure manual table 23, and the like.

Here, the work procedure manual table 23 includes data generated based on a work procedure manual indicating a procedure of the work to be performed by a worker (the inspection worker, the site worker, or the like), and indicates an action of the worker assumed from the work procedure. At least a part of the sensor 26 and the sensor 27 is provided to detect a state of the worker. When the state of the worker detected by the sensor 26 or the sensor 27 is consistent with the action indicated in the work procedure manual table 23, the abnormality detection unit 13 determines that the worker is in the steady state. On the other hand, when the detected state of the worker is inconsistent with the work procedure manual table 23, the abnormality detection unit 13 determines that the worker is in the unsteady state, that is, an abnormality occurs. As described above, the work procedure manual table 23 functions as work check data for detecting an abnormality in work.

As a specific example, a case where the worker operates a control panel will be described. The work procedure manual table 23 stores the number of times the worker stretches out hands co the control panel and a timing at which the worker stretches out the hands to the control panel. The number of times and timing can be derived from the work procedure. The left and right of the hands may be defined.

The measurement target side device 10 is a portable device and is installed near the control panel before the worker starts work. At this time, the measurement target side device 10 is installed such that the sensor 26 or the like can identify at least identifiable information as to whether the worker stretches out the hands to the work target.

The abnormality detection unit 13 detects an abnormality by identifying which hand the worker stretches out to the control panel at what timing based on the detection results of the sensor 26 or the like, and comparing it with the work procedure manual table 23.

Therefore, it is possible to detect a mistake in the work or stagnation of the work as an abnormality.

Information such as whether the hands are extended, a timing at which the hands are extended is low in accuracy requirements with respect to the detection result of the sensor. Therefore, even when the portable measurement target side device 10 is appropriately installed, it is possible to obtain sufficient information.

Figure 3:
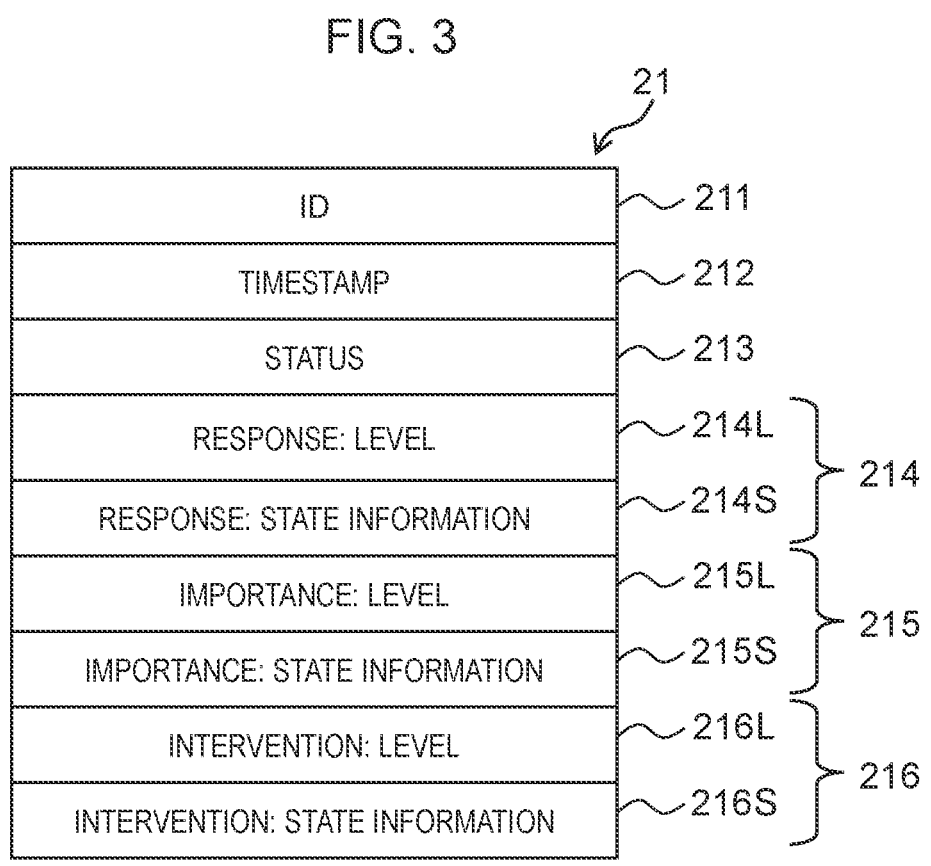
FIG. 3 is a diagram showing an example of a data structure of flag data.

FIG. 3 is a diagram showing an example of a data structure of the flag data 21. The flag data 21 includes an ID 211 for identifying the measurement target side device 10 in which a flag is generated and a notification event, a timestamp 212 indicating a time at which flag data is generated, a status 213 indicating a steady/unsteady state, response information 214 determined by an abnormal value from a sensor, importance information 215, and intervention information 216. The response information 214, the importance information 215, and the intervention information 216 include levels 214L, 215L, and 216L, which are flag levels of the respective information, and state information 214S, 215S, and 216S indicating states of the levels of the respective information.

The response information 214 is information for determining whether a person (site worker) is abnormal or a person is influenced. When it is determined that a person is abnormal or a person is influenced, a response level is set to "1". Next, it is determined whether a change in the surrounding environment or a change in the state of the facility is fast. When it is determined that the change is fast, the response level is set to "2". Otherwise, the response level is set to "3".

The importance information 215 is information for determining whether the surrounding environment is greatly influenced. When it is determined that the influence is large, the importance level is set to "1". Next, it is determined whether the information leads to damage to the infrastructure facility or the facility being used. When it is determined that the damage is caused, the response level is set to "2". Otherwise, the importance level is set to "3".

The intervention information 216 is information for determining whether intervention by an expert is necessary among remote instructions. When the intervention by the expert is determined to be necessary, an intervention level is set to "1". Next, it is determined whether intervention by artificial intelligence is necessary. When intervention by the artificial intelligence is determined to be necessary, the intervention level is set to "2". Otherwise, the intervention level is set to "3".

Referring back to FIG. 2, a configuration of the management device 30 is shown.

The management device 30 includes a processing unit 31, a storage unit 40, an input unit 45, a display unit 46, and a communication unit 47. The processing unit 31 includes a priority determination unit 32 that performs priority determination when a plurality of pieces of flag data are received, a measurement target state monitor unit 33 that monitors a state of a measurement target and a surrounding environment thereof, a sensing data selection unit 34 that generates instruction information of sensing data for grasping the state of the measurement target, a sensing data analysis unit 35 that generates a response instruction to a site worker, and the like.

The display unit 46 is a display or the like, and displays an execution state, an execution result, and the like of processing performed by the management device 30. The input unit 45 is a device such as a keyboard and a mouse for inputting an instruction to a computer, with which an instruction such as program activation is input. The processing unit 31 is a central processing unit (CPU) and executes various programs stored in the storage unit 40 or the like.

The communication unit 47 exchanges various data and commands with other devices via the network NW.

The storage unit 40 stores an acquired data determination table 41 to be acquired based on the flag data 21 from the measurement target side device 10 used in the processing S1, an instruction determination table 42 for a response instruction to the measurement target side device 10 to be used in the processing S2, an instruction content 43 based on the flag data 21 and the sensing data, notification data 44 to the measurement target, and the like.

Figure 4:
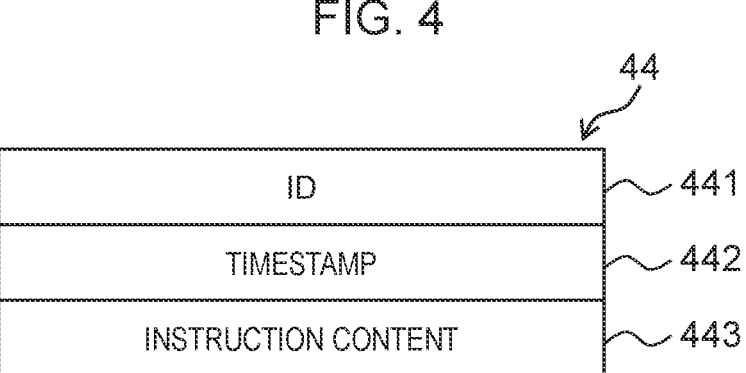
FIG. 4 is a diagram showing an example of a data structure of notification data from a management device.

FIG. 4 is a diagram showing an example of a data structure of the notification data 44 from the management device 30. The notification data 44 includes an ID 441 for identifying the measurement target side device 10 in which a flag is generated and a notification event, a timestamp 442 which is a time at which a notification is generated, an instruction content 443, and the like.

FIG. 5 is a diagram showing an example of the acquired data determination table 41 in the processing S1. The acquired data determination table 41 includes flag levels, state information, acquisition data, and the like. The flag levels are the levels 214L, 215L, and 216L shown in FIG. 3, and the state information is the state information 214S, 215S, and 216S shown in FIG. 3.

A specific example of data to be acquired will be described based on the flag level and the state information. When the response level in row 411 is "1", and information indicating that the posture is walking slowly and a facial color is poor is notified as the state information, position coordinates of a person, image data of the person, distance data of the person, temperature and humidity around the person, and vital information of the person are acquired.

When the response level in row 412 is "2" and information indicating that a facility and a person suddenly approach is notified as the state information, the position coordinates of the person and position coordinates of the facility are acquired.

When the response level in row 413 is "3" and information indicating torrential rain is notified as The state information, a rainfall amount and surrounding image data are acquired.

When the importance level in row 414 is "1" and information indicating environmental destruction is notified as the state information, the position coordinates of the person, the position coordinates of the infrastructure surrounding image data, surrounding environment data such as the temperature, the humidity, the gas concentration are acquired.

When the importance level in row 415 is "2" and information indicating self-destruction is notified as the state information, a sound, a vibration, and a temperature of the facility are acquired.

When the importance level in row 416 is "3" and information indicating that maintenance is required is notified as the state information, the sound of the facility, the temperature of the facility, continuous operation time, the surrounding image data, the surrounding environment data, and the position coordinates of the facility are acquired.

When the intervention level in row 417 is "1" and information indicating that determination by the expert is required is notified as the state information, the position coordinates of the person, the image data of the person, the distance data of the person, the temperature and humidity around the person, the position coordinates of the facility, the surrounding image data, surrounding distance data, surrounding temperature and humidity, the rainfall amount, the sound of the facility, and the temperature of the facility are acquired.

When the intervention level in row 418 is "2" and information indicating that an artificial intelligence instruction is required is notified as the state information, the same data group as that in the case where the intervention level is "1" is acquired.

When the intervention level in row 419 is "3" and information indicating only an emergency treatment is notified as the state information, acquisition of the sensing data is not necessary.

In the example of FIG. 5, three examples of each of the levels of the response, the importance, and the intervention are shown, but the invention is not limited thereto. For example, the level may be "1" and a plurality of pieces of state information exist.

FIG. 6 is a diagram showing an example of the instruction determination table 42 in the processing S2. The instruction determination table 42 includes flag levels, state information, determination criteria, and the like. The flag levels are the levels 214L, 215L, and 216L shown in FIG. 3, and the state information is the state information 214S, 215S, and 216S shown in FIG. 3.

A specific example of the determination criteria will be described based on the flag levels, the state information, and the sensing data. When the response level in row 421 is "1" and information indicating that the posture is walking slowly and the facial color is poor is notified as the state information, a walking speed is determined based on the position coordinates of the person, vital states such as the facial color, the pulse, and a fatigue level are determined based on the image data of the person, the posture and the fatigue level are determined based on the distance data of the person, and a comfort level of the working environment is determined based on the temperature and humidity around the person.

The determination criteria are as follows: when the fatigue level is 80% or more, a break of 1 h or longer is required; when the posture is crouching or falling down, rescue is required; and when the walking speed is unsteady or a leg cramp occurs, a break of 1 h or longer is required; and when the temperature/humidity is 39° C./90% for 1 h, a break of 0.5 h is required. Here, h is a unit of time.

When the response level in row 422 is "2" and information indicating that a person is suddenly approaching an unmanned transport vehicle (drone), a movable part of a facility including a movable part, or the like is notified as the state information, a closest approach prediction distance and a closest approach prediction time are determined based on the position coordinates of the person and the position coordinates of the facility.

The determination criteria are as follows: when the closest approach distance is 3 m and a prediction time is in 15 s, the facility is stopped, and in other cases, an alarm is issued to the person to reduce a moving speed of the facility.

When the response level in row 423 is "3" and the information indicating the torrential rain is notified as the state information, whether an activity can be continued is determined based on the rainfall amount and a rainfall state of the surrounding image data. The determination criteria are as follows: according to a rainfall meter and results of image recognition, when a rainfall amount of 500 mm/h continues for 0.5 h, the facility stopped, and when the rainfall amount of 500 mm/h continues for 1 h, the facility is evacuated.

When the importance level in row 424 is "1" and information indicating surrounding environment destruction such as explosion, heat generation, a sign of explosion, malignant gas generation, or electric leakage is notified as the state information, the closest approach distance is determined based on the position coordinates of the person and the position coordinates of the facility, and evacuation necessity is determined based on the surrounding image data and the surrounding distance data. The determination criteria are as follows: when the closest approach distance is 3 m, the facility is stopped, and when an unrecognized object or an object that should not approach is detected as the results of the image recognition of the surrounding image data and the distance data, it is determined that the evacuation is required.

When the importance level in row 425 is "2" and the information indicating the self-destruction is notified as the state information, a specific frequency at which a failure or deterioration of a component can be predicted is detected based on the sound of the facility, and a portion that reaches a high temperature higher than expected is detected based on the temperature. The determination criteria are as follows: as a result of the analysis of the sound of the facility, when a specific frequency is detected and continues for one minute, the facility is stopped; as a result of the analysis of the temperature, when a portion of 90 degrees or more is detected and continues for one minute, the facility is stopped.

When the importance level in row 426 is "3" and the information indicating that maintenance is required is notified as the state information, a specific frequency at which a failure or deterioration of a component can be predicted is detected based on the sound of the facility, a portion that reaches a high temperature higher than expected is detected based on the temperature of the facility, whether maintenance work is required is determined based on the continuous operation time, and the movement time from a current position to a maintenance place is estimated based on the surrounding image data, the surrounding distance data, and the position coordinates of the facility.

The determination criteria are as follows: as a result of the analysis of the sound of the facility, when a specific frequency is detected, maintenance is determined to be required; when a portion of 90 degrees or more is detected as a result of the analysis of the temperature of the facility, maintenance is determined to be required; when the continuous operation time is 50 h or more, maintenance is determined to be required, and the necessary movement time and the remaining operation time are calculated based on the self-position, the surrounding image data, and the surrounding distance data.

When the intervention level in row 427 is "1" and information indicating that determination by the expert is required is notified as the state information, a method of handling a case where a plurality of abnormalities occur in the expert is determined based on the position coordinates of the person, the image data of the person, the distance data of the person, the temperature and humidity around the person, the position coordinates of the facility, the surrounding image data, the surrounding distance data, the surrounding temperature and humidity, the rainfall amount, the sound of the facility, and the temperature of the facility. For example, priority determination at the time of simultaneous occurrence of a plurality of flags, evacuation instruction at the time when evacuation destinations/movement destinations of the persons/facilities conflict. For example, a work difficulty level specified in the work procedure manual may be high, and the intervention by the expert may be essential. Specifically, when it is detected that the standard work time for each work processing defined in the work procedure manual is set as a threshold and much time exceeding the threshold is required, the work may not be carried out smoothly and stagnation or delay may occur, and the intervention by the expert is determined to be necessary.

When the intervention level in row 428 is "2" and information indicating that an artificial intelligence instruction is required is notified as the state information, based on the same data group as that in the case where the intervention level is "1", a method of handling a case where an independent abnormality not included in an emergency processing list occurs is determined by the artificial intelligence based on a database. For example, a method of handling a case where an unknown object that is not in the list is recognized, or an abnormal sound of a frequency that is not in the list is detected as the results of the image recognition.

When the intervention level in row 429 is "3" and information indicating only an emergency treatment is notified as the state information, the determination processing is unnecessary.

<Effects of Abnormal State Monitoring System 100 of Measurement Target>

Effects of the abnormal state monitoring system 100 of the measurement target are as follows.

(1) Since a size of notification data (flag data 21 (see FIG. 3)) from the measurement target side device 10 to the management device 30 is small, even when a large number of notifications are simultaneously generated from a large number of sites, the management device 30 can be noted in real time.

(2) Since the urgency and importance are determined before notification from the measurement target side device 10 to the management device 30, a processing load on a management device 30 side is small. The management device 30 can easily determine the priority and can handle a large number of measurement targets.

(3) When the measurement target side device 10 detects abnormal data, first, the measurement target side device 10 performs an emergency treatment on the measurement targets, and thus a response delay does not occur.

(4) A site situation can be accurately grasped by a combination of sensing obtained by a large number of sensors. For example, in sensing of a person, by combining coordinates (position), a posture, an action, and vital information, states (a health level, a fatigue level, a safety level of a surrounding facility and comfort of a working environment) of a site worker can be grasped more accurately.

(5) By analyzing detailed sensing data by the management device 30, it is possible to create an improvement measure with higher accuracy than the analysis by the measurement target side device 10.

(6) By identifying the action of the worker and determining the consistency with the action derived from the work procedure manual, it is possible to detect a mistake or stagnation of the work at an early stage and support the worker.

<Processing of Abnormal State Monitoring System 100 of Measurement Target>

Processing of the abnormal state monitoring system 100 of the measurement target will be described below.

Figure 7:
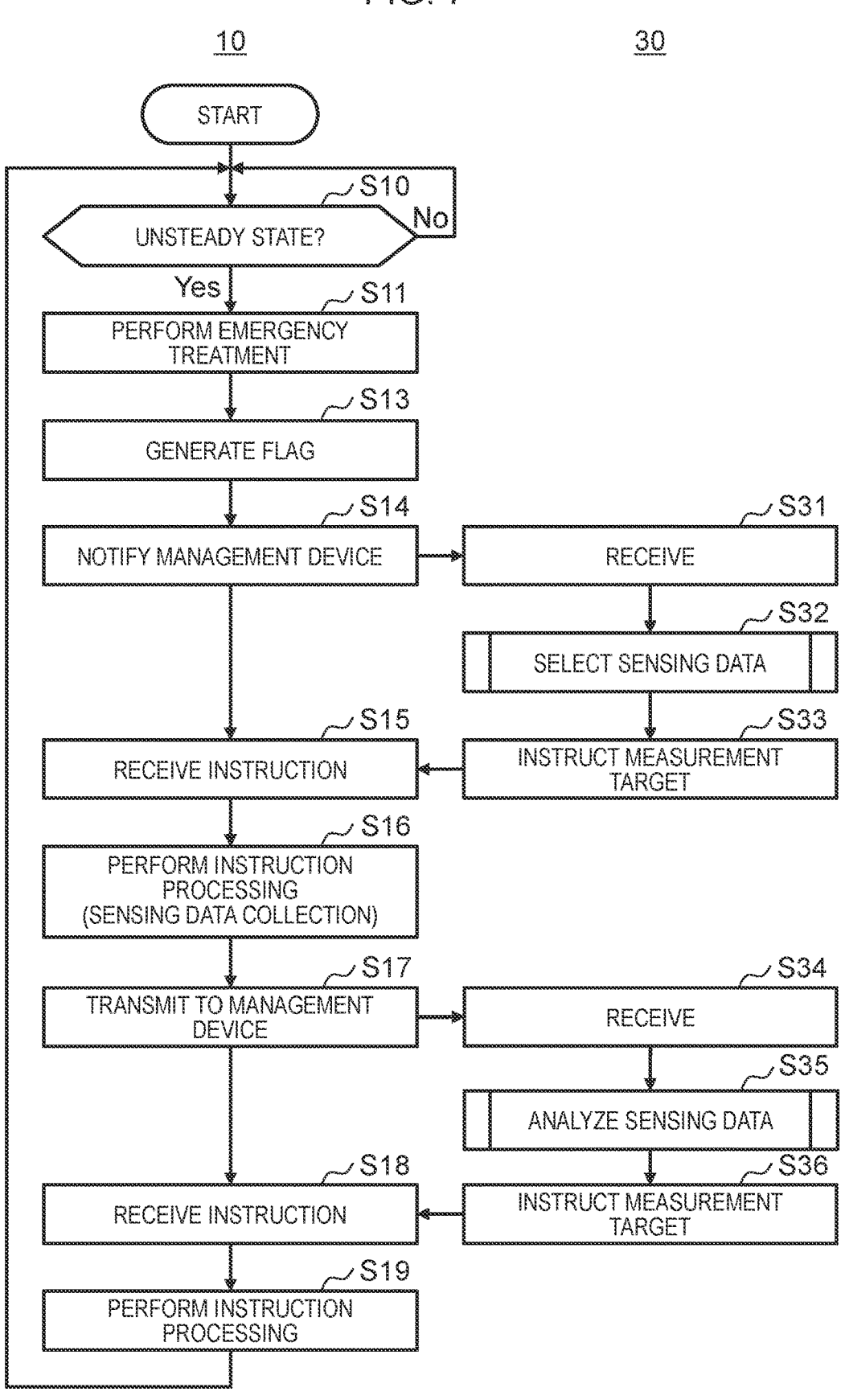
FIG. 7 is a flowchart showing overall processing of the abnormal state monitoring system of the measurement target.

FIG. 7 is a flowchart showing overall processing of the abnormal state monitoring system 100 of the measurement target. Description is made with reference to FIGS. 2 and 3 as appropriate. The abnormality detection unit 13 of the measurement target side device 10 determines whether the sensor information acquired by the sensor information acquisition unit 12 is unsteady (whether the sensor information is abnormal) (processing S10), and returns to the processing S10 when the sensor information is not unsteady (processing S10, No), and performs an emergency treatment when the sensor information unsteady (processing S10, Yes) (Processing S11). The emergency treatment is taken based on the emergency treatment determination table 22 stored in the storage unit 20. The abnormality processing unit 14 obtains the response information 214, the importance information 215, and the intervention information 216 shown in FIG. 3 via the Flag generation unit 15 (processing S13: flag generation processing). Next, the abnormality processing unit 14 notifies the management device 30 of the flag data 21 (see FIG. 3) (processing S14).

When receiving an instruction from the management device 30 (processing S15), the abnormality processing unit 14 of the measurement target side device 10 performs instruction processing of sensing data collection (processing S16). The abnormality processing unit 14 transmits the sensing data to the management device 30 (processing S17).

When the abnormality processing unit 14 of the measurement target side device 10 receives the instruction from the management device 30 (processing S18), the abnormality processing unit 14 performs processing of the instruction (processing S19), and returns to the processing S10.

On the other hand, when receiving the flag data 21 from the measurement target side device 10 (processing S31), the measurement target state monitor unit 33 of the management device 30 obtains the item of the data to be acquired shown in FIG. 5 via the sensing data selection unit 34 (processing S32), and instructs the measurement target side device 10 to acquire the sensing data (processing S33).

Thereafter, when receiving the sensing data from the measurement target side device 10 (processing S34), the measurement target state monitor unit 33 of the management device 30 obtains a response instruction according to the determination criteria shown in FIG. 6 via the sensing data analysis unit 35 (processing S35), and issues the response instruction to the measurement target side device 10 (processing S36).

Figure 8:
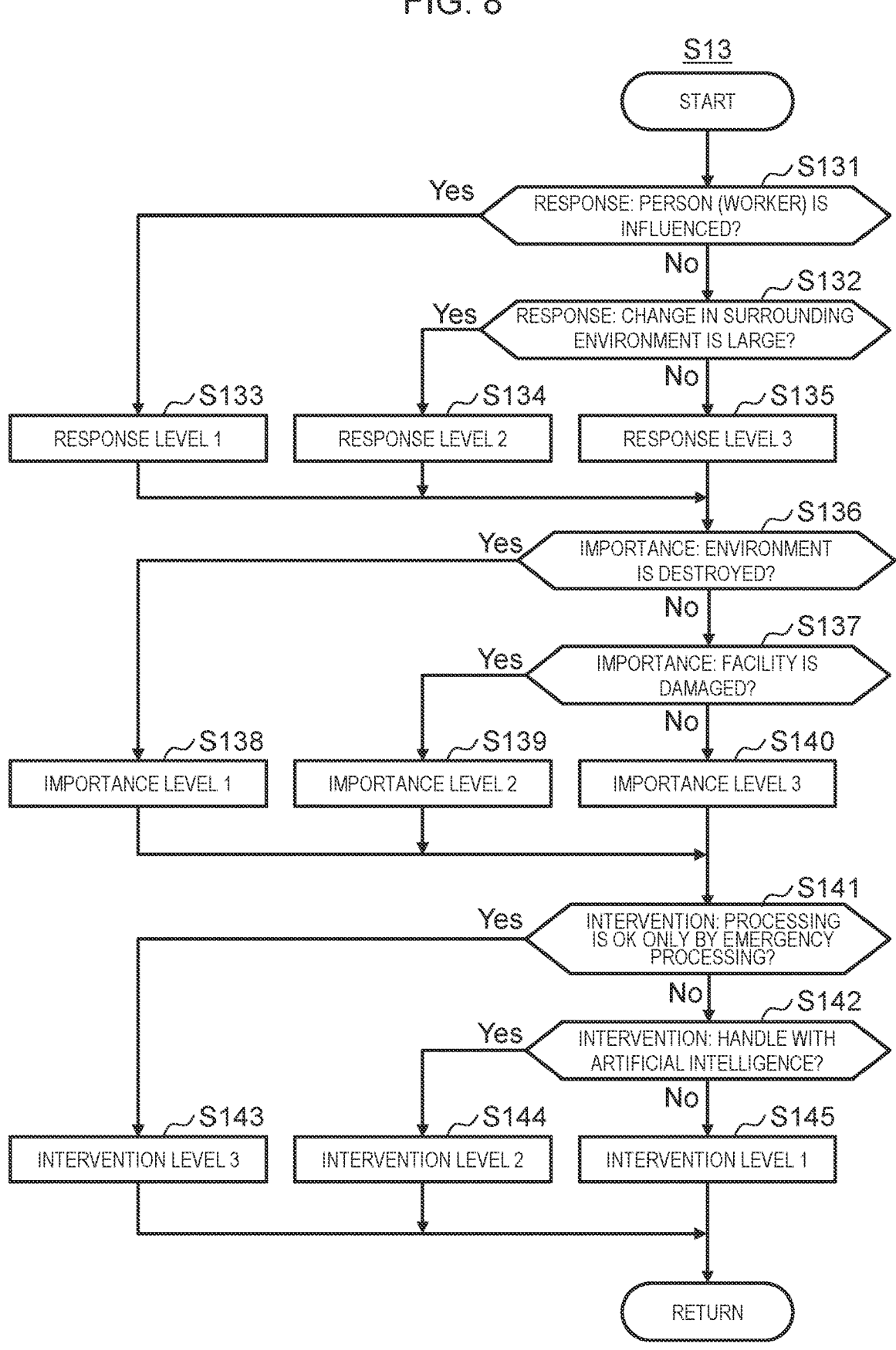
FIG. 8 is a flowchart showing flag generation processing in the measurement target.

FIG. 8 is a flowchart showing the flag generation processing (processing S13) in the measurement target side device 10. Description is made with reference to FIGS. 2 and 3 as appropriate. The flag generation unit 15 of the measurement target side device 10 determines whether a person (worker) abnormal or a person is influenced (processing S131). When determining that a person is abnormal or a person is influenced (processing S131, Yes), the flag generation unit 15 sets the response level 214L to "1", sets the state information 214S (processing S133), and proceeds to processing S136. When determining that a person is not abnormal or a person is not influenced (processing S131, No), the flag generation unit 15 proceeds to processing S132.

Next, the flag generation unit 15 determines whether the change in the surrounding environment or the change in the state of the facility is fast (the change is large) (processing S132). When determining that the change in the surrounding environment or the change in the state of the facility is fast (processing S132, Yes), the flag generation unit 15 sets the response level 214L to "2", sets the state information 214S (processing S134), and proceeds to processing S136.

When the change is not fast, in other cases (processing S132, No), the flag generation unit 15 sets the response level 214L to "3", sets the state information 214S (processing S135), and proceeds to processing S136.

The flag generation unit 15 determines whether the surrounding environment is greatly influenced (whether the environment is destroyed) (processing S136). When determining that the surrounding environment is greatly influenced (processing S136, Yes), the flag generation unit 15 sets the importance level 215L to "1", sets the state information 215S (processing S138), and proceeds to processing S141. When determining that the surrounding environment is not greatly influenced (processing S136, No), the flag generation unit 15 proceeds to processing S137.

Next, the flag generation unit 15 determines whether a damage of an infrastructure facility or a facility in use is caused (processing S137). When determining that the damage is caused (processing S137, Yes), the flag generation unit 15 sets the importance level 215L to "2", sets the state information 215S (processing S139), and proceeds to processing S141. Otherwise (processing S137, No), the flag generation unit 15 sets the importance level 215L to "3", sets the state information 215S (processing S140), and proceeds to processing S141.

Further, the flag generation unit 15 determines whether the processing is OK only by emergency processing (processing S141). When determining that the processing is OK only by the emergency processing (processing S141, Yes), the flag generation unit 15 sets the intervention level 216L to "3", sets the state information 216S (processing S143), and ends the flag Generation processing (processing S13). When the processing is not OK only by the emergency processing (processing S141, No), the flag generation unit 15 proceeds to processing S142.

The flag generation unit 15 determines whether it is necessary to handle with the artificial intelligence (processing S142). When determining that it is necessary to handle with the artificial intelligence (processing S142, Yes), the flag generation unit 15 sets the intervention level 216L to "2", sets the state information 216S (processing S144), and ends the flag generation processing (processing S13). When it is not necessary to handle with the artificial intelligence (processing S142, No), the flag generation unit 15 sets the intervention level 216L to "1", sets the state information 216S (processing S145), and ends the flag generation processing (processing S13).

Figure 9:
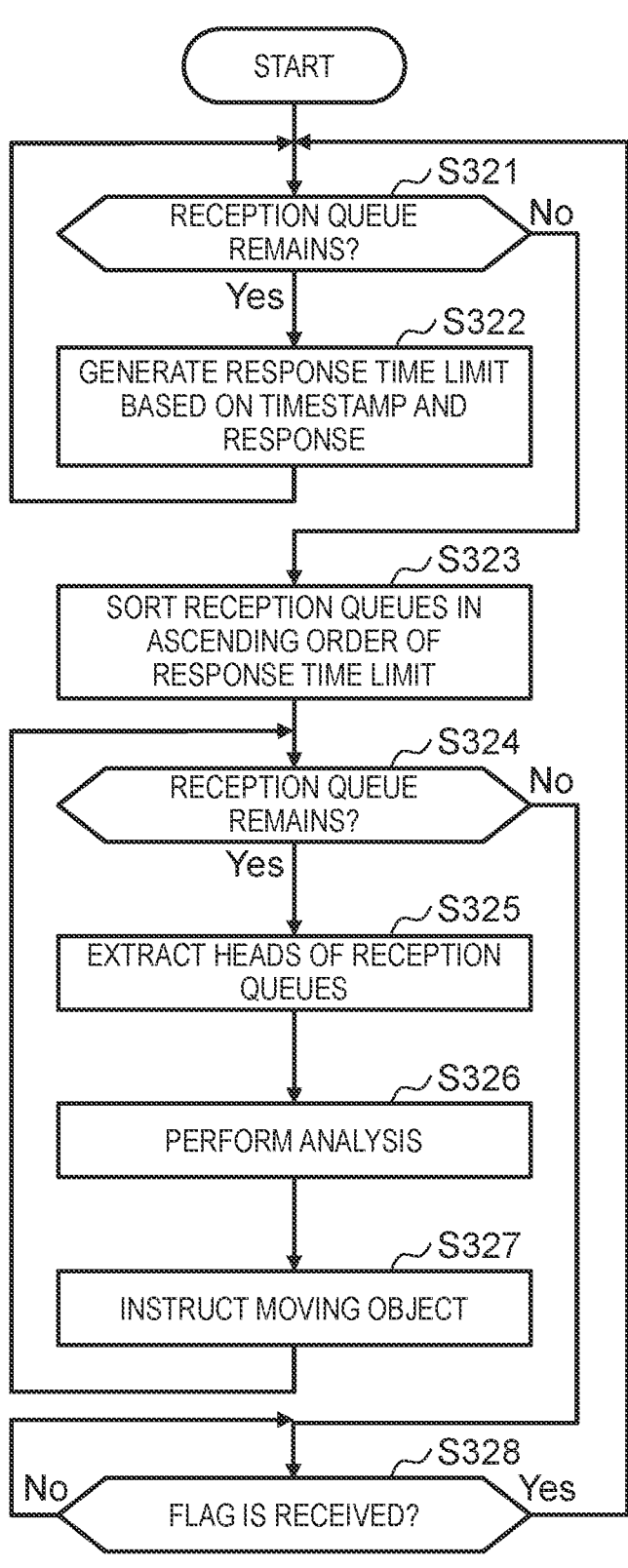
FIG. 9 is a flowchart showing priority determination processing of a plurality of flags in the management device.

FIG. 9 is a flowchart showing priority determination processing of a plurality of flags in a management server. Description is made with reference to FIGS. 2 and 3 as appropriate. The priority determination processing is more specifically shown in the processing S31 to the processing S36 of the measurement target state monitor unit 33 shown in FIG. 7 The processing S31 and S34 in FIG. 7 correspond to the processing S328 in FIG. 9, and the processing S32 and S35 in FIG. 7 correspond to the processing S327 in FIG. 9. The processing S33 and S36 in FIG. 7 correspond to the processing S327 in FIG. 9.

The priority determination unit 32 of the management device 30 determines whether a reception queue transmitted from the measurement target of each place remains (processing S321). When a reception queue exists (processing S321, Yes), the priority determination unit 32 generates a response time limit based on the timestamp 212 of the flag data 21 and the response level 214L (processing S322), and returns to the processing S321. When no reception queue remains (processing S321, No), the priority determination unit 32 proceeds to processing S323.

The priority determination unit 32 sorts reception queues in ascending order of the response time (processing S323), determines whether a reception queue that has not been processed remains (processing S324), proceeds processing S325 when a reception queue remains (processing S324, Yes), and proceeds to processing S328 when no reception queue remains (processing S324, No).

The priority determination unit 32 extracts heads of the reception queues (processing S325), performs analysis of the processing S1 or the processing S2 (processing S326), transmits instruction information to the measurement target (processing S327), and returns to the processing S324.

In the processing S328, the priority determination unit 32 determines whether the flag data 21 is received from the measurement target side device 10, returns to the processing S328 when the flag data 21 is not received (processing S328, No), and returns to the processing S321 when the flag data 21 is received (processing S328, Yes).

Figure 10:
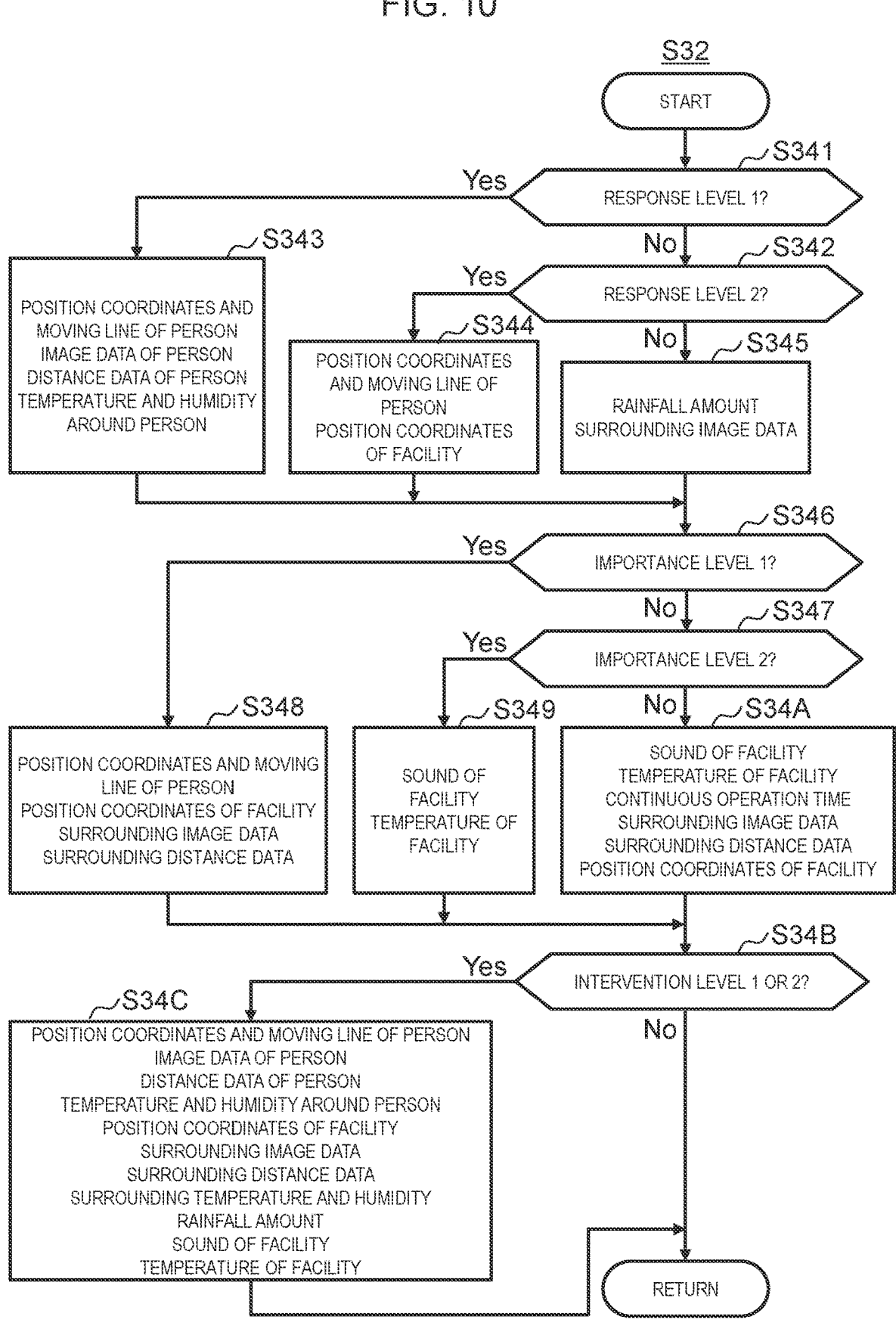
FIG. 10 is a flowchart showing sensing data selection processing in the processing S1 in the management device.

FIG. 10 is a flowchart showing sensing data selection processing (processing S32) in the processing S1 in the management device 30. Description is made with reference to FIGS. 2 and 3 as appropriate. The sensing data selection unit 34 selects sensing data necessary for analysis based on the acquired data determination table 41.

The sensing data selection unit 34 determines whether the response level is "1" (processing S341). When the response level is "1", the information indicating that the posture is walking slowly and the facial color is poor is notified as the state information (processing S341, Yes), the sensing data selection unit 34 selects the position coordinates of the person, the image data of the person, the distance data of the person, and the temperature and the humidity around the person as the acquired data (processing S343), and proceeds to processing S346. When the response level is not "1" (processing S341, No), the sensing data selection unit 34 proceeds to processing S342.

The sensing data selection unit 34 determines whether the response level is (processing S342). When the response level is "2", the information indicating that a facility and a person suddenly approach is notified as the state information (processing S342, Yes), the sensing data selection unit 34 selects the position coordinates of the person and the position coordinates of the facility as the acquired data (processing S344), and proceeds to the processing S346. When the response level is not "2" (processing S342, No), the sensing data selection unit 34 proceeds to processing S345.

In the processing S345, when the response level is "3", the information indicating torrential rain is notified as the state information, the sensing data selection unit 34 selects the rainfall amount and the surrounding image data as the acquired data, and proceeds to the processing S346.

In the processing S346, the sensing data selection unit 34 determines whether the importance level is "1". When the importance level is "1", the information indicating environmental destruction is notified as the state information (processing S346, Yes), the sensing data selection unit 34 selects the position coordinates of the person, the position coordinates of the facility, the surrounding image data, and the surrounding distance data as the acquired data (processing S348), and proceeds to the processing S34B. When the importance level is not "1" (processing S346, No), the sensing data selection unit 34 proceeds to processing S347.

When the importance level is "2" and the information indicating self-destruction notified as the state information (processing S347, Yes), the sensing data selection unit 34 selects the sound, the vibration, and the temperature of the facility as the acquired data (processing S349), and proceeds to the processing S34E. When the importance level is not "2" (processing S347, No), the sensing data selection unit 34 proceeds to processing S34A.

In the processing S34A, when the importance level is "3" and the information indicating that maintenance is required is notified as the state information, the sensing data selection unit 34 selects the sound of the facility, the temperature of the facility, the continuous operation time, the surrounding image data, the surrounding distance data, and the position coordinates of the facility as the acquired data, and proceeds to the processing S34B, In the processing S34B, the sensing data selection unit 34 determines whether the intervention level is "1" or "2". When the information indicating that determination by the expert is required and artificial intelligence instruction is required is notified as the state information (processing S34B, Yes), the sensing data selection unit 34 selects the position coordinates of the person, the image data of the person, the distance data of the person, the temperature and humidity around the person, the position coordinates of the facility, the surrounding image data, the surrounding distance data, the surrounding temperature and humidity, the rainfall amount, the sound of the facility, and the temperature of the facility as the acquired data, and ends the sensing data selection processing (processing S32) of the processing S1. When the intervention level is not "1" or "2", the sensing data selection unit 34 ends the sensing data selection processing (processing S32, No) of the processing S1.

Figure 11:
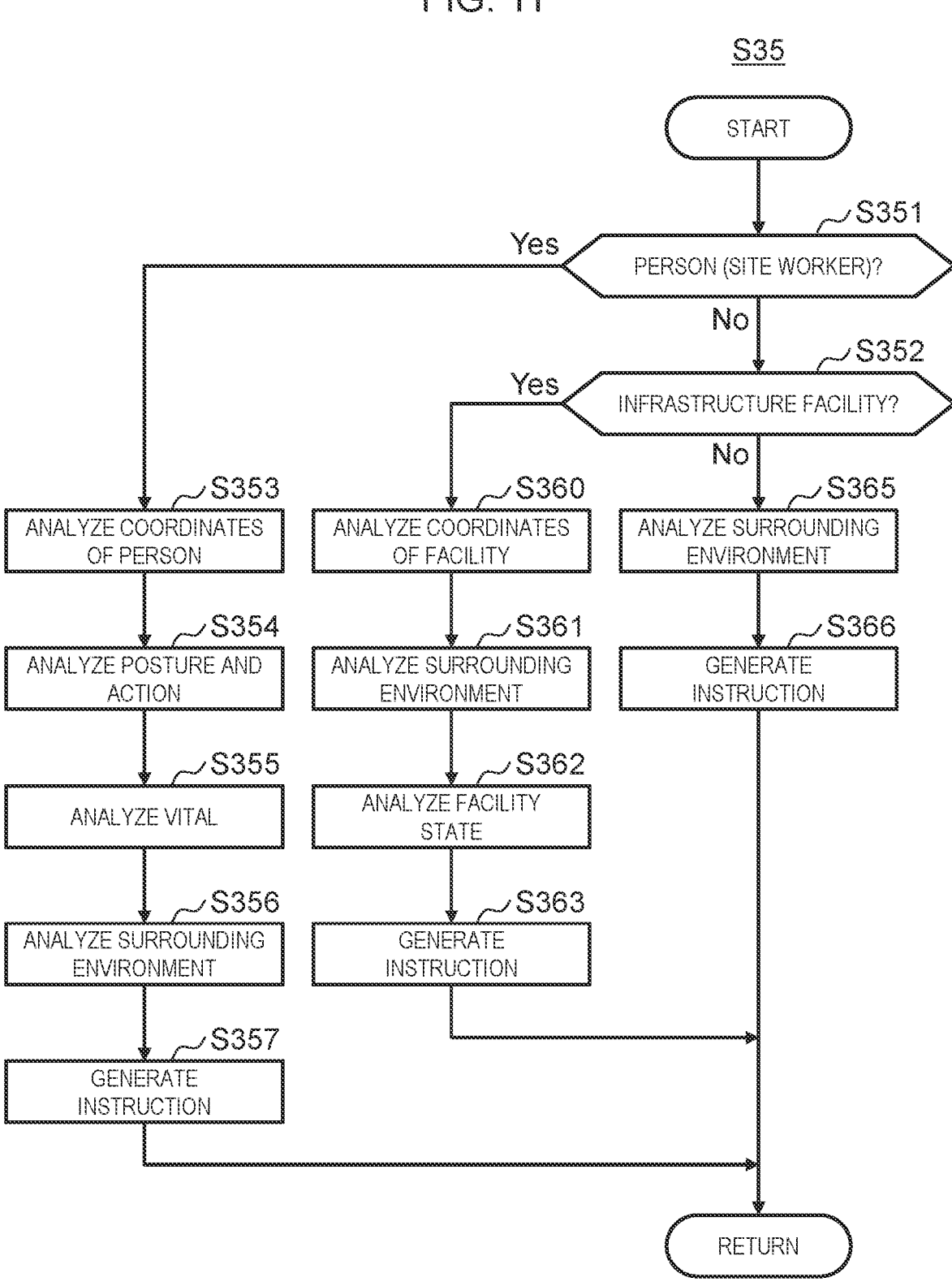
FIG. 11 is a flowchart showing sensing data analysis processing in the processing S2 in the management device.

FIG. 11 is a flowchart showing sensing data analysis processing (processing S35) in the processing S2 in the management device 30. Description is made with reference to FIGS. 2 and 3 as appropriate. The sensing data selection unit 34 selects a response instruction for the measurement target based on the flag data 21, the sensing data, and the instruction determination table 42.

The sensing data analysis unit 35 determines whether the measurement target is a person (processing S351). When the measurement target is a person (processing S351, Yes), the sensing data analysis unit 35 analyzes coordinates of the person based on the acquired sensing data (processing S353), analyzes posture and action (processing S354), analyzes a vital (processing S355), analyzes surrounding environment of the person (processing S356), generates instruction information (processing S357), and ends the sensing data analysis processing (processing S35) of the processing S2. When the measurement target is not a person (processing S351, No), the sensing data analysis unit 35 proceeds to processing S352.

The vital is an abbreviation of a vital sign. The vital is the most basic information related to the life of a patient, which is also translated into a sign of a vital. Specifically, the four vitals often refer to pulse or heart rate, respiration (rate), blood pressure, and body temperature, and current situation of a person is grasped and shown from this numerical information.

In the processing S353 to the processing S356, when the response level is "1" and the information indicating that the posture is walking slowly and the facial color is poor is notified as the state information, the sensing data analysis unit 35 determines a walking speed based on the position coordinates of the person, determines vital states such as the facial color, the pulse, and the fatigue level based on the image data of the person, determines the posture and the fatigue level based on the distance data of the person, and determines the comfort level of the working environment based on the temperature and humidity around the person.

In the processing S357, the determination criteria are as follows: when the fatigue level is 80% or more, a break of 1 h or more is required; when the posture is crouching or falling down, rescue is required; and when the walking speed is unsteady or a leg cramp occurs, a break of 1 h or longer is required; and when the temperature/humidity is 39° C./90% for 1 h, a break of 0.5 h is required.

In the processing S353 to the processing S356, when the response level is "2" and the information indicating that a facility and a person suddenly approach is notified as the state information, the sensing data analysis unit 35 determines the closest approach prediction distance and the closest approach prediction time based on the position coordinates of the person and the position coordinates of the facility.

In the processing S357, the determination criteria are as follows: when the closest approach distance is 3 m and a prediction time is in 15 s, the facility is stopped; and in other cases, an alarm is issued to a person, a moving speed of the facility is reduced, and an operation schedule is changed.

In the processing S357, when the response level is "3" and the information indicating the torrential rain is notified as the state information, the sensing data analysis unit 35 determines whether an activity can be continued based on the rainfall amount and the rainfall state of the surrounding image data. The determination criteria are as follows: according to a rainfall meter and results of image recognition, when a rainfall amount of 500 mm/h continues for 0.5 h, the facility is stopped; and when the rainfall amount of 500 mm/h continues for 1 h, the facility is evacuated.

The sensing data analysis unit 35 determines whether the measurement target is an infrastructure facility (processing S352). When the measurement target is an infrastructure facility (processing S352, Yes), the sensing data analysis unit 35 analyzes coordinates of the infrastructure facility based on the acquired sensing data (processing S360), analyzes surrounding environment (processing S361), analyzes a facility state (processing S362), generates instruction information (processing S363), and ends the sensing data analysis processing (processing S35) of the processing S2. When the measurement target is not an infrastructure facility (processing S352, No), the sensing data analysis unit 35 proceeds to processing S365.

In the processing S360 to the processing S362, when the importance level is "1" and information indicating building destruction is notified as the state information, the sensing data analysis unit 35 determines the closest approach distance based on the position coordinates and a moving line of the person and the position coordinates of the facility, and determines evacuation necessity based on the surrounding image data and the surrounding distance data.

In the processing S363, the determination criteria are as follows: when the closest approach distance is 3 m, the facility is stopped; and when an unrecognized object or an object that should not approach is detected as the results of the image recognition of the surrounding image data and the distance data, the evacuation is required.

In the processing S360 to the processing S362, when the importance level is "2" and the information indicating the self-destruction is noted as the state information, the sensing data analysis unit 35 detects specific frequency at which a failure or deterioration of a component can be predicted based on the sound of the facility, and detects a portion that reaches a high temperature higher than expected based on the temperature.

In the processing S363, the determination criteria are as follows: as a result of the analysis of the sound of the facility, when a specific frequency is detected and continues for one minute, the facility is stopped; as a result of the analysis of the temperature, when a portion of 90 degrees or more is detected and continues for one minute, the facility is stopped.

In the processing S360 to the processing S362, when the importance level is "3" and the information indicating that maintenance is required is notified as the state information, the sensing data analysis unit 35 detects a specific frequency at which a failure or deterioration of a component can be predicted based on the sound of the facility, detects a portion that reaches a high temperature higher than expected based on the temperature of the facility, determines whether maintenance work is required based on the continuous operation time, and estimates the movement time from a current position to a maintenance place based on the surrounding image data, the surrounding distance data, and the position coordinates of the facility.

In the processing S363, the determination criteria are as follows: as a result of the analysis of the sound of the facility, when a specific frequency is detected, maintenance is determined to be required; when a portion of 90 degrees or more is detected as a result of the analysis of the temperature, maintenance is determined to be required; when the continuous operation time is 50 h or more, maintenance is determined to be required, and the necessary movement time and the remaining operation time are calculated from the self-position, the surrounding image data, and the surrounding distance data.

In the processing S365, the sensing data analysis unit 35 analyzes the surrounding environment, generates instruction information (processing S366), and ends the sensing data analysis processing (processing S35) of the processing S2.

In the processing S365, when the intervention level is "1" and the information indicating that determination by the expert is required is notified as the state information, the sensing data analysis unit 35 determines a method of handling a case where a plurality of abnormalities occur in the expert based on the position coordinates of the person, the image data of the person, the distance data of the person, the temperature and humidity around the person, the position coordinates of the facility, the surrounding image data, the surrounding distance data, the surrounding temperature and humidity, the rainfall amount, the sound of the facility, and the temperature of the facility. For example, priority determination at the time of simultaneous occurrence of a plurality of flags, evacuation instruction at the time when evacuation destinations/movement destinations of the persons; facilities conflict.

In the processing S365, when the intervention level is "2" and the information indicating that an artificial intelligence instruction is required is notified as the state information, based on the same data group as that in the case where the intervention level is "1", the sensing data analysis unit 35 determines a method of handling a case where an independent abnormality not included in an emergency processing list occurs by the artificial intelligence based on a database. For example, a method of handling a case where an unknown object that is not in the list is recognized, or an abnormal sound of a frequency that is not in the list is detected as the results of the image recognition.

In the, processing S365, when the intervention level is "3" and the information indicating only an emergency treatment is notified as the state information, acquisition of the sensing data is not necessary for the sensing data analysis unit 35.

FIG. 12 is a diagram showing instruction contents based on the flag data and the sensing data in the processing S2. In row 431, when the response level is "1" and information indicating that the posture is walking slowly and the facial color is poor is notified as the state information, since it is determined that the walking speed is 2 km/h and the person is walking while wobbling based on the distance data, vital states in which a fatigue level is 90% are determined from the facial color, and the comfort level of the working environment is poor since the temperature and humidity are 37 degrees and 90%, an instruction that a break of 1 h or longer is required is given.

In row 432, when the response level is "2" and the information indicating that a facility and a person suddenly approach is notified as the state information, since it is determined that the moving speed of the person is 4 km/h, the moving speed of the facility is 40 km/h, the closest approach prediction distance between the person and the facility is 1 m, and the closest approach prediction time is 20 seconds later, an instruction to reduce the speed of the facility is given.

In row 433, when the response level is "3" and the information indicating the torrential rain is notified as the state information, since the rainfall amount of 100 m continues for five hours, rainfall is confirmed according to a rainfall state of the surrounding image data, and it is determined that the activity cannot be continued, an instruction to stop the facility is given.

In row 434, when the importance level is "1" and information indicating environment destruction is notified as the state information, since it is determined that another facility is present in the periphery but no person is present based on an analysis result of the closest approach distance of 5 m between the person and the facility, the image data and the distance data, an instruction to evacuate the facility is given.

In row 435, when the importance level is "2" and the information indicating the self-destruction is notified as the state information, a specific frequency of 90 Hz is detected for one minute or more based on the sound of the facility, and a portion that has reached 90 degrees or more for one minute or more based on the temperature is detected, an instruction to stop the facility is given.

In row 436, when the importance level is "3" and the information indicating that maintenance is required is notified as the state information, since it is determined that a specific frequency (90 Hz) is detected, a portion having a temperature of 90° C. or more is detected, the continuous operation time is 50 h or more, and the required movement time is 2 h and a remaining operation time is 6 h based on the self-position, the surrounding image data, and the surrounding distance data, an instruction to end the work at the maximum of 4 hours and shift to maintenance work is given.

In row 437, when the intervention level is "1" and the information indicating that determination by the expert is required is notified as the state information, since the expert recognizes that a plurality of abnormalities such as two facilities approaching each other have occurred and recognizes that a person is present in the vicinity of the evacuation destination based on the position coordinates of the person, the image data of the person, the distance data of the person, the temperature and humidity around the person, the position coordinates of the facility, the surrounding image data, the surrounding distance data, the surrounding temperature and humidity, the rainfall amount, the sound of the facility, and the temperature of the facility, an instruction to stop three facilities and issue an alarm to the person is given.

In row 438, when the intervention level is "2" and the information indicating that an artificial intelligence instruction is required is notified as the state information, since based on the same data group as that in the case where the intervention level is "1", the artificial intelligence determines that the unknown object is an abnormally invading vehicle based on the analysis result from the database of the image data, an instruction to stop the facility and to issue an alarm the person present in the vicinity and the abnormally invading vehicle is given.

In row 439, when the intervention level is "3" and information indicating only an emergency treatment is notified as the state information, no instruction is given.

FIG. 13 is a diagram showing contents of the work procedure manual table 23.

In row 1311, work ID is "A", and determination condition for the first work processing A1 in processing A are shown.

The determination defined by row 1311 is as follows.

When a left hand is detected a times or more and b times or less, no abnormality is determined.

When a right hand is detected c times or more and d times or less, no abnormality is determined.

When a detection start timing of the left hand is between e seconds and f seconds after the start of the work processing A1, no abnormality is determined.

When a detection start timing of the right hand is between g seconds and h seconds after the start of the work processing A1, no abnormality is determined.

When a detection end timing of the left hand is between i seconds and j seconds after the start of the work processing A1, no abnormality is determined.

When a detection end timing of the right hand is between k seconds and m seconds after the start of the work processing A1, no abnormality is determined.

When a detection time length of the left hand is n seconds or more and p seconds or less per time, no abnormality is determined.

When a detection time length of the right hand is q seconds or more and r seconds or less per time, no abnormality is determined.

Regarding the presence or absence of the next processing, when work processing A2 is present and an interval from the work processing A2 is a seconds or more and t seconds or less, no abnormality is determined.

For example, when it is necessary to determine the detection start timing and the detection end timing as separate timings every detection of the hand, it is possible to handle the detection by allocating one detection of the hand to one working processing (for example, A1, A2, or the like).

In row 1312, work ID is "A", and determination conditions for the second work processing A2 in the processing A are shown.

The determination defined by row 1312 is as follows.

When a left hand is detected a' times or more and b' times or less, no abnormality is determined.

When a right hand is detected c' times or more and d' times or less, no abnormality is determined.

When a detection start timing of the left hand is between e' seconds and f' seconds after the start of the work processing A2, no abnormality is determined.

When a detection start timing of the right hand is between g' seconds and h' seconds after the start of the work processing A2, no abnormality is determined.

When a detection end timing of the left hand is between i' seconds and j' seconds after the start of the work processing A2, no abnormality is determined.

When a detection end timing of the right hand is between k' seconds and m' seconds after the start of the work processing A2, no abnormality is determined.

When a detection time length of the left hand is n' seconds or more and p' seconds or less per time, no abnormality is determined.

When a detection time length of the right hand is seconds or more and r' seconds or less per time, no abnormality is determined.

Regarding the presence or absence of the next processing, when work processing A3 is present and an interval from the work processing A3 is s' seconds or more and t' seconds or less, no abnormality is determined.

In row 1313, the work ID is "A", and determination conditions for the third work processing A3 in the processing A are shown. The number of times of the detection of the left hand to the detection time length of the right hand are similar to those in row 1311 and row 1312, so they are omitted, and the presence or absence of the next processing is shown as none.

In row 1314, determination conditions regarding the work processing having the work ID of "B" are shown, but similar to those in row 1311 to row 1313, and thus the description thereof is omitted.

Figure 14:
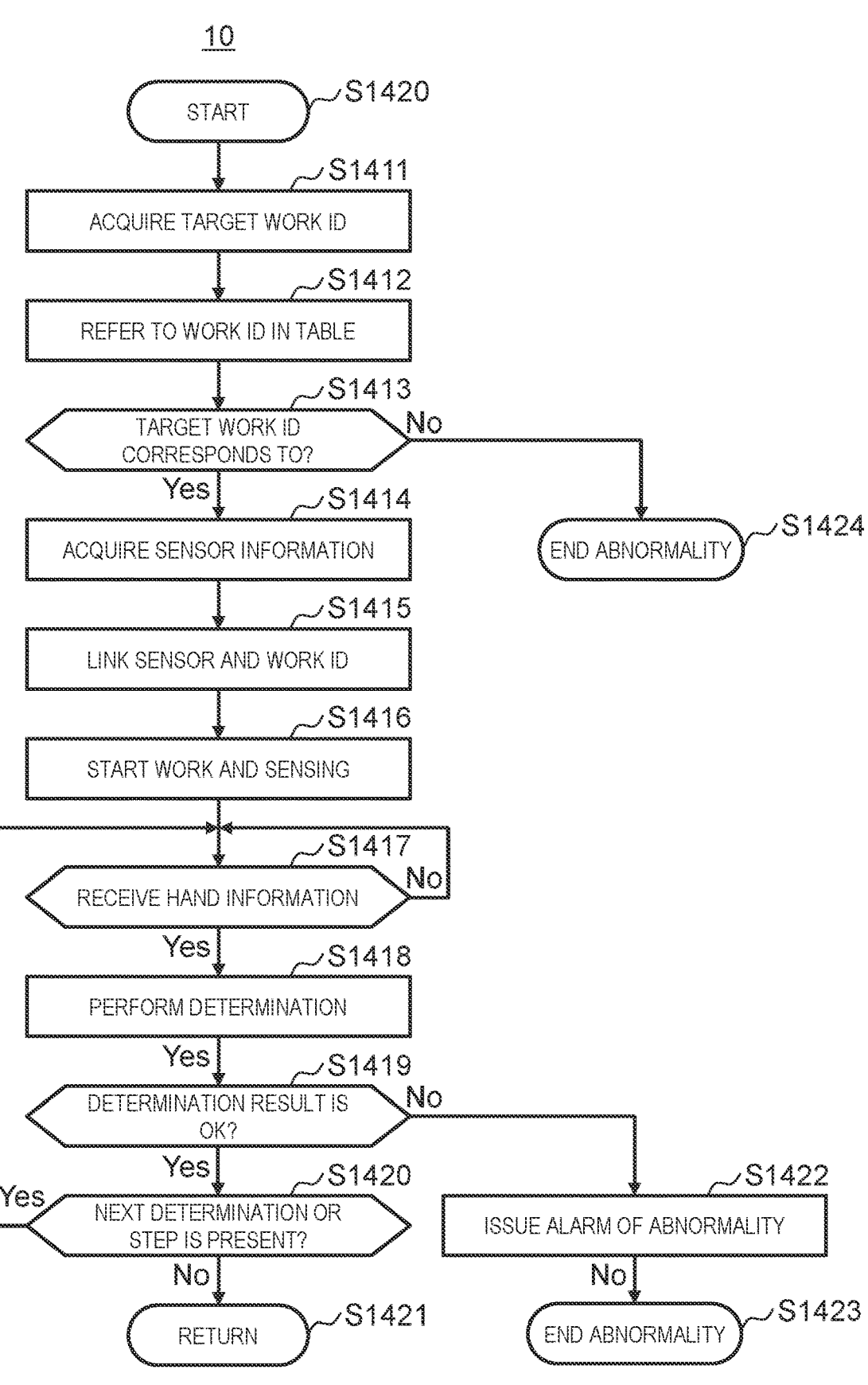
FIG. 14 is a flowchart showing unsteady state determination processing in the measurement target.

FIG. 14 is flowchart showing unsteady state determination processing (processing S10) of the processing S2 in the measurement target side device 10. FIGS. 2 and 13 are referred to appropriately. When the communication unit 25 of the measurement target side device 10 receives the work ID, the communication unit 25 transfers the work ID to the processing unit 11, and the processing unit 11 acquires the work ID (processing S1411). The processing unit 11 refers to the work procedure manual table 23 and refers to the work ID in the table (processing S1412).

When the target work ID corresponds to the work ID in the table (processing S1413, Yes), the sensor information acquisition unit 12 of the processing unit 11 acquires the sensor information (processing S1414). When the target work ID does not correspond to the work ID in the table (processing S1413, N), the processing unit 11 determines that the work is out of the measurement target and ends the abnormality (processing S1424).

The sensor information acquisition unit 12 acquires information of a sensor to be measured (processing S1414), and links the sensor information and the work ID (processing 31415). When the work starts, the processing unit 11 starts sensing (processing S1416), and waits for reception of hand information from the sensor (processing S1417). When the hand information is received, the abnormality detection unit 13 refers to determination conditions of the work procedure manual table 1310 described with reference to FIG. 13, performs determination on a determination condition of the corresponding work ID (processing S1418), and determines whether an abnormality occurs in a determination result (processing S1419). When an abnormality occurs as the determination result (processing S1419, No), the abnormality detection unit 13 issues an alarm of the abnormality (processing S1422), and ends the abnormality (processing S1423). When no abnormality occurs as the determination result (processing S1419, Yes), the processing unit 11 checks whether the next determination condition or the next work processing is present (processing S1420). When the next processing is present (processing S1420, Yes), the processing unit 11 waits for the reception of the hand. information from the sensor (processing S1417). When the next determination processing is not present (processing S1420, No), the processing unit 11 ends the processing (processing S1421).

As described above, the system disclosed in the embodiment includes: the sensor information acquisition unit 12 serving as a sensor information acquisition unit configured to acquire sensor information indicating a detection result from the sensors 26 and 27 that detect a state of a worker, the storage unit 20 serving as a work check data holding unit configured to hold in advance, as work check data, an action of the worker assumed from a work procedure, and the abnormality detection unit 13 serving as an abnormality detection unit configured to compare the sensor information with the work check data to detect an abnormality in the work.

According to such a configuration, an abnormality in work can be detected at an early stage, a worker can be supported, and work efficiency and quality can be improved.

The disclosed system includes the sensor information acquisition unit, the work check data holding unit, and the abnormality detection unit, and includes the measurement target side device 10 as a target side device provided in the vicinity of a work target, which is a target of the work, and/or the work target itself, and the management device 30 capable of communicating with the target side device. Further, the target side device includes a control unit (for example, the abnormality processing unit 14 and the flag generation unit 15) configured to generate flag data including a flag indicating an abnormal level and state information indicating an abnormal state when the abnormality detection unit detects an abnormality, and transmit the flag data to the management device. The management device transmits instruction information to at least one of the target side device, the worker, and the work target based on the flag data received from the target side device.

Accordingly, since a size or notification data (flag data 21 (see FIG. 3)) from the measurement target side device 10 to the management device 30 is small, even when a large number of notifications are simultaneously generated from a large number of sites, the management device 30 can be notified in real time.

The sensor information includes at least identifiable information as to whether the worker stretches out hands to the work target, and the work check data indicates the number of times the worker stretches out the hands to the work target and a timing at which the worker stretches out the hands to the work target.

Further, the sensor is a portable measurement device, the work check data holding unit holds a plurality of work check data corresponding to a plurality of work targets, and the abnormality detection unit selects the work check data based on information for identifying the work target, and compares the selected work check data with the sensor information to detect an abnormality.

According to such a configuration, an abnormality in work of a worker can be easily and inexpensively detected.

The management device 30 includes the storage unit 40 configured to store the acquired data determination table 41 in which an abnormal level, state information, and acquired data are associated. When receiving the flag data 21 from the measurement target side device 10, the management device 30 can transmit an instruction to acquire necessary sensing data to the measurement target side device 10 in accordance with the abnormal level of the flag data 21.

Further, the management device 30 stores, in the storage unit 40, a handling method determination table for determining a handling method based on the abnormal level, the state information, and the sensing data. When receiving the sensing data from the measurement target side device 10, the management device 30 can transmit instruction information, which is a handling method to the measurement target, to the measurement target side device 10 based on the handling method determination table (for example, the instruction determination table 42).

The flag data 21 includes response information for determining whether a person is abnormal or a person is influenced, importance information for determining whether a surrounding environment is greatly influenced, and intervention information determining whether intervention by an expert is necessary among remote instructions. Accordingly, since the urgency and importance are determined before notification from the measurement target side device 10 to the management device 30, a processing load on a management device 30 side is small. The management device 30 has an effect of easily determining the priority, and being able to simultaneously handle a large number of measurement targets at sites.

In the present embodiment, the infrastructure facility and the site worker have been described as measurement targets, but the invention is not limited thereto. For example, there are a manufacturing facility and a site worker at a manufacturing site.

As described above, the disclosed invention can be applied to various applications, and contributes to solving the problems in the field of manufacturing industry and infrastructure maintenance.

In the fields of manufacturing and infrastructure maintenance, especially in countries and regions where the population is declining, the birthrate is declining, and the population is aging, there is a problem of a shortage of on-site labor. To solve this problem, there are measures such as making a business process efficient, promoting the worker participation of a larger number of citizens, such as women, elderly people, and foreign people, and evacuating the labor required for the business and propelling the unmanned aerial vehicle. With respect to the efficiency of business, labor evacuation, and unmanned a measure using an information communication technique is provided. For example, a tablet PC or an AR/VR technique is applied to the support of the work of the site worker. However, as a problem of measures using the information communication technique, there is a point of how to realize work support for unsteady work that is difficult to handle by a non expert or work with a high degree of difficulty. When a configuration in which a limited number of experts support inexperienced persons at the site is assumed, in a situation in which the experts are insufficient, the number of cases is limited depending on the number of experts, and efficiency is poor.

Therefore, by using the disclosed system, is possible to provide support by experts at an early stage to day experts in the field.

What is claimed is:

1. An abnormal state monitoring system comprising:
a sensor information acquisition unit configured to acquire, from a sensor configured to detect a physical health state of a worker, sensor information indicating a detection result;
a work check data holding unit configured to hold in advance, as work check data, an action of the worker assumed from a work procedure;
an abnormality detection unit configured to detect an abnormality in work by comparing the sensor information with the work check data;
a target side device provided in the vicinity of a work target, which is a target of the work, and/or the work target itself; and
a management device configured to communicate with the target side device,
wherein the target side device further includes a control unit configured to generate flag data including a flag indicating an abnormal level and state information indicating an abnormal state when the abnormality detection unit detects an abnormality, and transmit the flag data to the management device,
wherein the management device transmits instruction information to at least one of the target side device, the worker, and the work target based on the flag data received from the target side device,
wherein the flag data includes
response level and state information for determining whether the physical health state of the worker is abnormal or influenced;
importance information for determining whether a surrounding environment is influenced due to destruction or damage at a facility; and
intervention information for determining whether intervention by an expert is necessary among remote instructions,
wherein the importance information comprises a first importance state indicating a state of environmental destruction at the facility, a second importance state indicating a state of self-destruction at the facility, and a third importance state indicating a state of maintenance being required at the facility,
wherein the management device is configured to transmit, when the flag data is received from the target side device, an instruction to acquire necessary sensing data to the target side device in accordance with an abnormal level of the flag data,
wherein when the flag data indicates the first importance state, the management device is configured to request the target side device to obtain position coordinates of the worker and position coordinates of the facility using the sensor information acquisition unit, and
wherein when the flag data indicates the second and third importance states, the management device is configured to request the target side device to obtain sound and temperature information at the facility using the sensor information acquisition unit.

2. The abnormal state monitoring system according to claim 1, wherein
the sensor information includes at least identifiable information as to whether the worker stretches out hands to the work target, and
the work check data indicates the number of times the worker stretches out the hands to the work target and a timing at which the worker stretches out the hands to the work target.

3. The abnormal state monitoring system according to claim 1, wherein
the sensor is a portable measurement device,
the work check data holding unit holds a plurality of work check data corresponding to a plurality of work targets, and
the abnormality detection unit selects the work check data based on information for identifying the work target, and compares the selected work check data with the sensor information to detect an abnormality.

4. The abnormal state monitoring system according to claim 1, wherein
the management device includes a storage unit configured to store a data acquisition determination table in which the abnormal level, the state information, and sensing data that needs to be acquired are associated.

5. The abnormal state monitoring system according to claim 4, wherein
the management device
stores, in the storage unit, a handling method determination table for determining a handling method based on the abnormal level, the state information, and the sensing data, and
transmits, when the sensing data is received from the target side device, the handling method specified based on the handling method determination table to the target side device as instruction information.

6. The abnormal state monitoring system according to claim 1, wherein the work target is an infrastructure facility of a construction site, and the worker is a site inspector.

7. An abnormal state monitoring method comprising:

a work check data holding step of holding, as work check data, an action of a worker assumed from a work procedure;

a sensor information acquisition step of acquiring, from a sensor configured to detect a physical health state of the worker, sensor information indicating a detection result;

an abnormality detection step of detecting an abnormality in work by comparing the sensor information with the work check data; and generating flag data including a flag indicating an abnormal level and state information indicating an abnormal state when the abnormality is detected, wherein the flag data includes response level and state information for determining whether the physical health state of the worker is abnormal or influenced;

importance information for determining whether a surrounding environment is influenced due to destruction or damage at a facility; and intervention information for determining whether intervention by an expert is necessary among remote instructions, wherein the importance information comprises a first importance state indicating a state of environmental destruction at the facility, a second importance state indicating a state of self-destruction at the facility, and a third importance state indicating a state of maintenance being required at the facility, wherein when the flag data indicates the first importance state, the method further comprises obtaining position coordinates of the worker and position coordinates of the facility, and wherein when the flag data indicates the second and third importance states, the method further comprises obtaining sound and temperature information at the facility.

* * * * *